(12) United States Patent
Kato et al.

(10) Patent No.: US 8,824,059 B2
(45) Date of Patent: Sep. 2, 2014

(54) ZOOM LENS SYSTEM AND OPTICAL INSTRUMENT USING THE SAME

(75) Inventors: Koji Kato, Saitama (JP); Masakazu Saori, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 130 days.

(21) Appl. No.: 13/482,178

(22) Filed: May 29, 2012

(65) Prior Publication Data

US 2012/0307374 A1  Dec. 6, 2012

(30) Foreign Application Priority Data

May 30, 2011 (JP) ................................. 2011-120495

(51) Int. Cl.
*G02B 15/14* (2006.01)

(52) U.S. Cl.
USPC ............ 359/684; 359/676; 359/680; 359/682

(58) Field of Classification Search
USPC .......................... 359/680–682, 686, 689, 684; 396/72–88; 348/240.97–246.3, 348/335–369
See application file for complete search history.

(56) References Cited

U.S. PATENT DOCUMENTS

| | | | |
|---|---|---|---|
| 5,668,668 A | 9/1997 | Shibayama et al. | |
| 5,721,642 A | 2/1998 | Shibayama et al. | |
| 5,798,871 A | 8/1998 | Shibayama et al. | |
| 6,246,529 B1 | 6/2001 | Sensui | |
| 2004/0051958 A1 | 3/2004 | Yoneyama | |
| 2005/0134968 A1 | 6/2005 | Ogata | |
| 2009/0185293 A1* | 7/2009 | Harada | 359/784 |
| 2010/0195219 A1 | 8/2010 | Kato | |

FOREIGN PATENT DOCUMENTS

| | | |
|---|---|---|
| JP | 08-304704 | 11/1996 |
| JP | 2000-131611 | 5/2000 |
| JP | 2004-85600 | 3/2004 |
| JP | 2005-181851 | 7/2005 |
| JP | 2005-181852 | 7/2005 |
| JP | 2010-204647 | 9/2010 |

\* cited by examiner

*Primary Examiner* — James Greece
*Assistant Examiner* — Sharrief Broome
(74) *Attorney, Agent, or Firm* — Greenblum & Bernstein P.L.C.

(57) ABSTRACT

A zoom lens system includes a negative first lens group, a positive second lens group, and a positive third lens group, in that order from the object side. The second lens group constitutes a focusing lens group. The following conditions (1) and (2) are satisfied:

$$0.4 < |d12w/f1| < 1.06 \quad (1); \text{ and}$$

$$d12w < d23w \quad (2),$$

wherein f1 designates the focal length of the first lens group, and d12w and d23w designate the air distances between the first and second lens groups, and the second and third lens groups respectively, at the short focal length extremity.

10 Claims, 29 Drawing Sheets

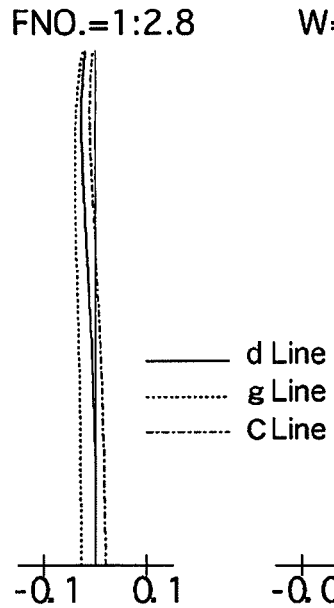 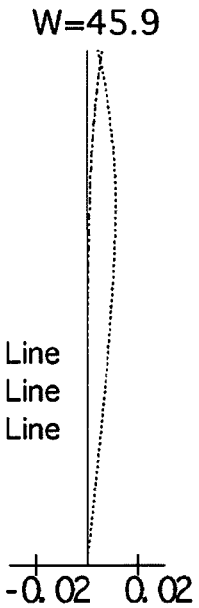 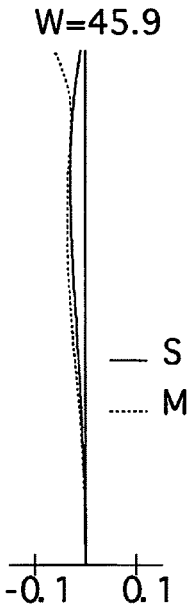 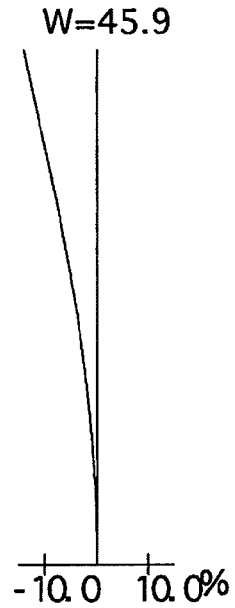
Fig. 5A — FNO.=1:2.8 — SPHERICAL ABERRATION CHROMATIC ABERRATION
Fig. 5B — W=45.9 — LATERAL CHROMATIC ABERRATION
Fig. 5C — W=45.9 — ASTIGMATISM
Fig. 5D — W=45.9 — DISTORTION
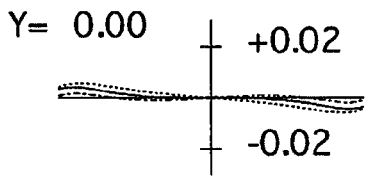
Fig. 6A — Y= 0.00
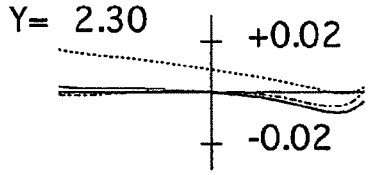
Fig. 6B — Y= 2.30
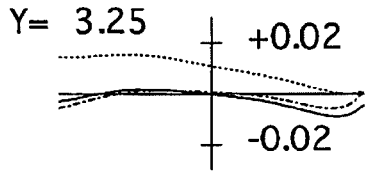
Fig. 6C — Y= 3.25
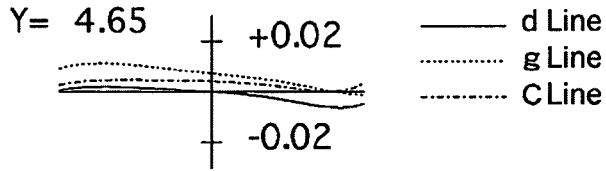
Fig. 6D — Y= 4.65

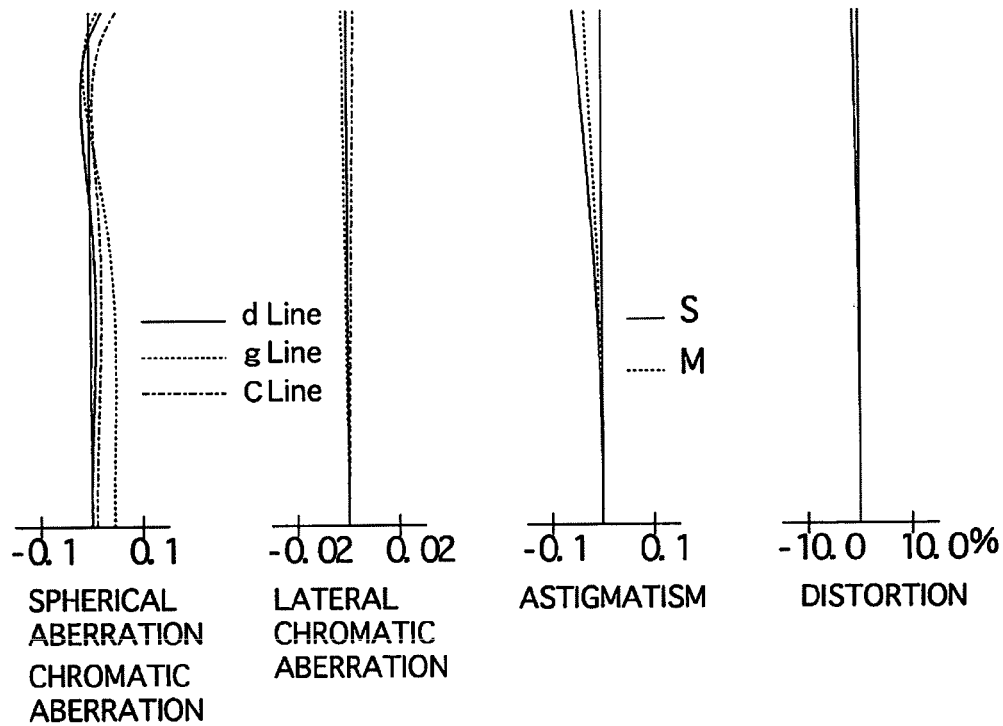
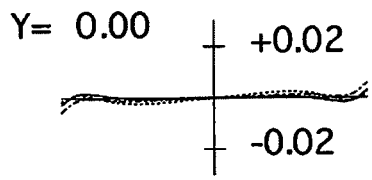
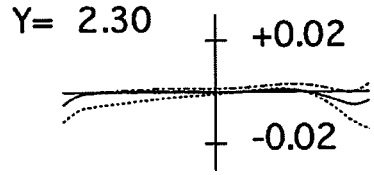
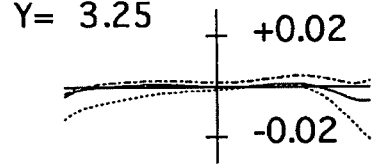
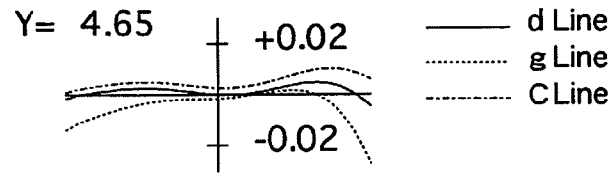

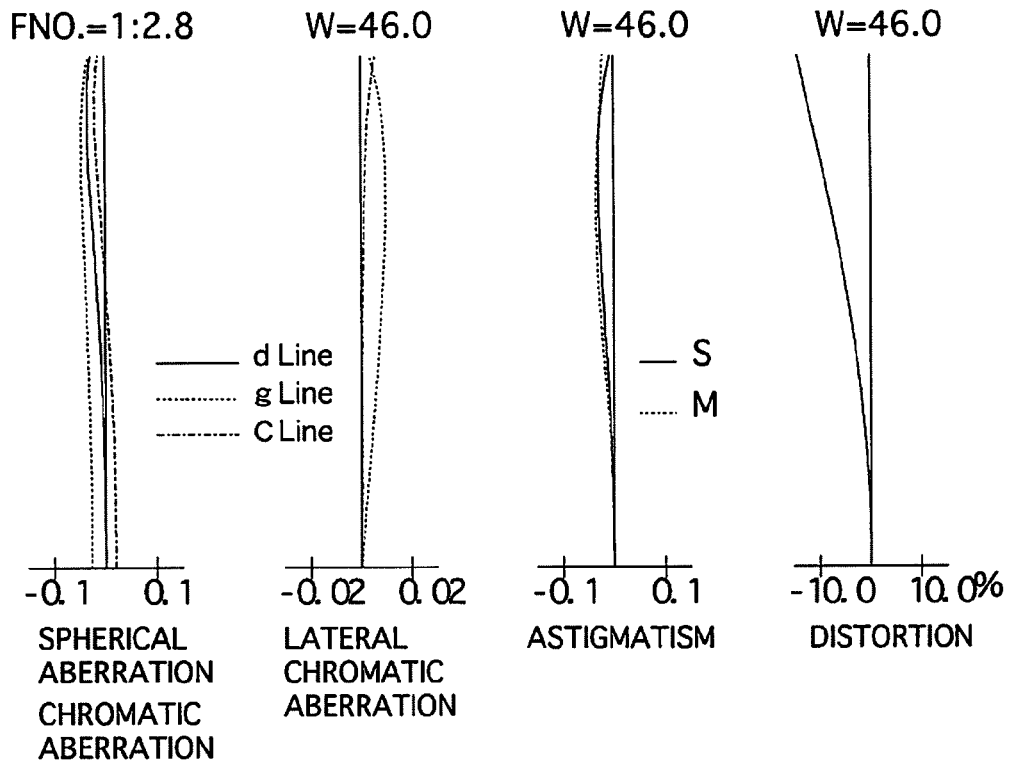
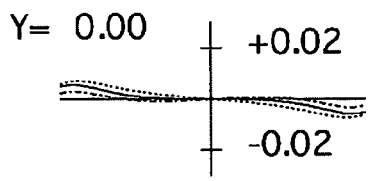
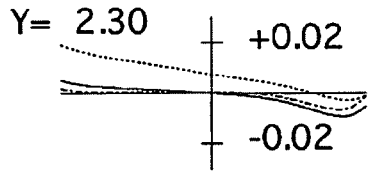
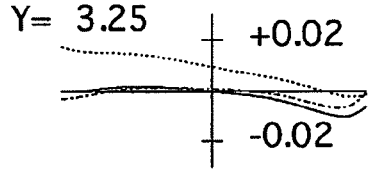
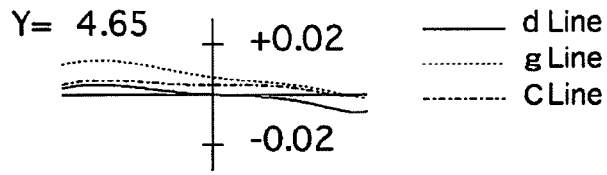

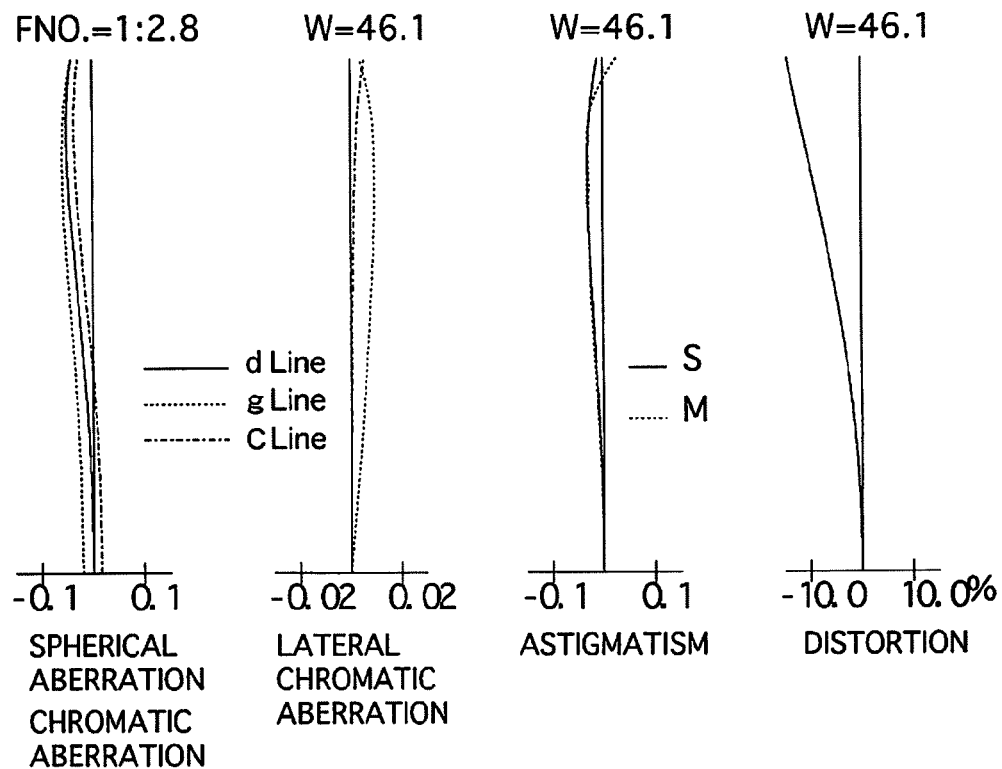
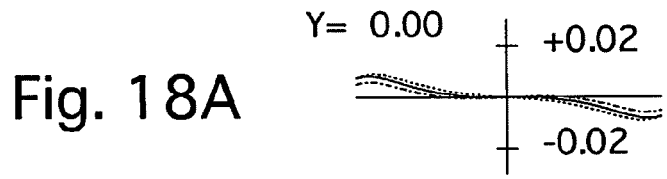
Fig. 18A
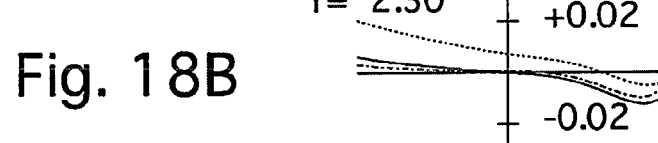
Fig. 18B
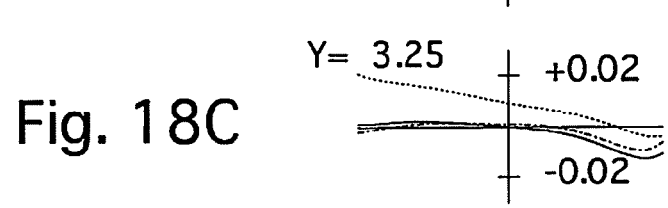
Fig. 18C
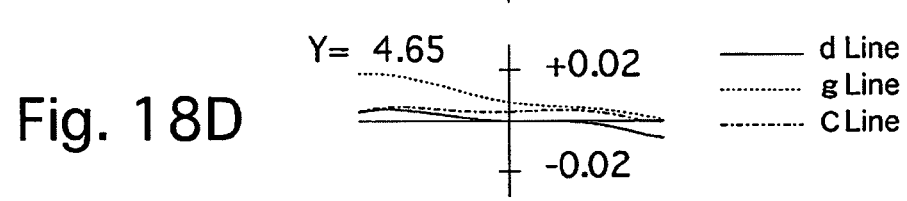
Fig. 18D

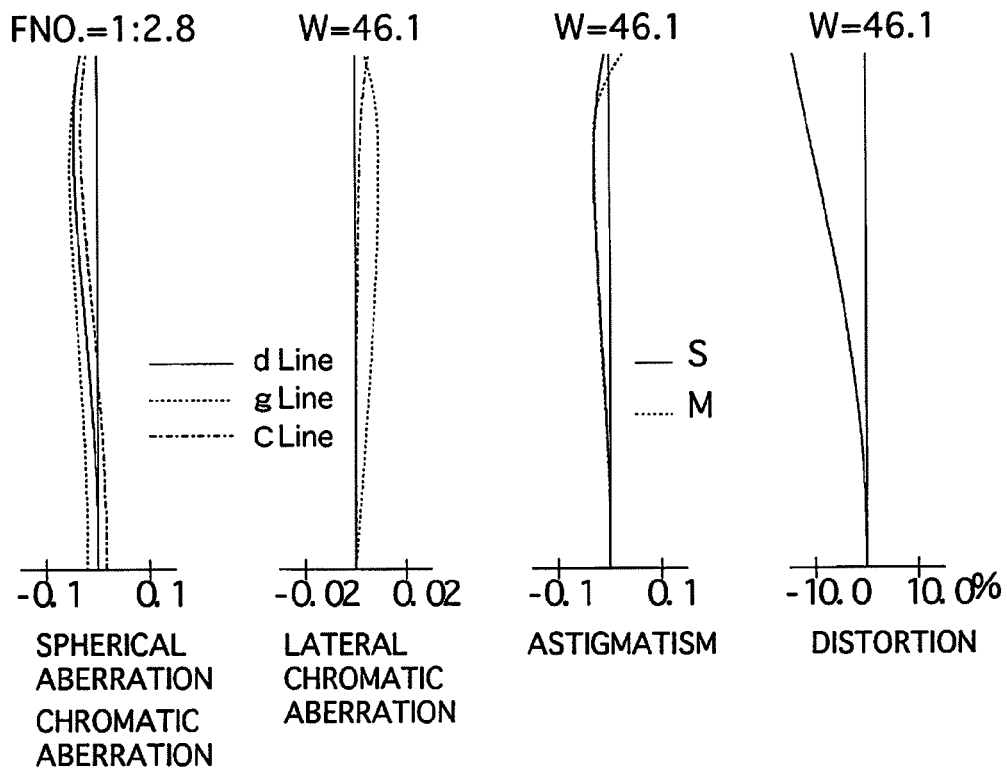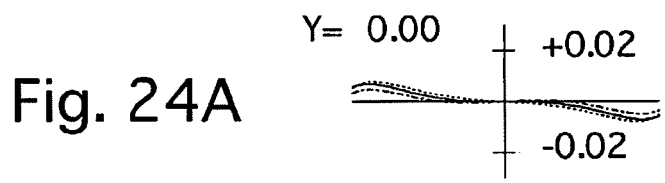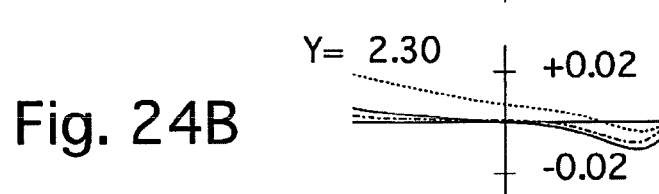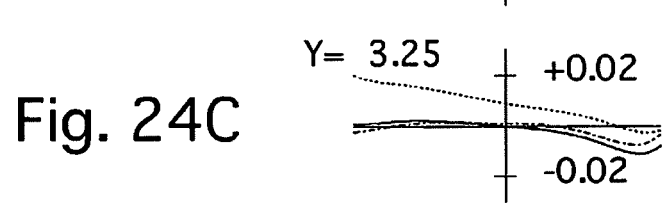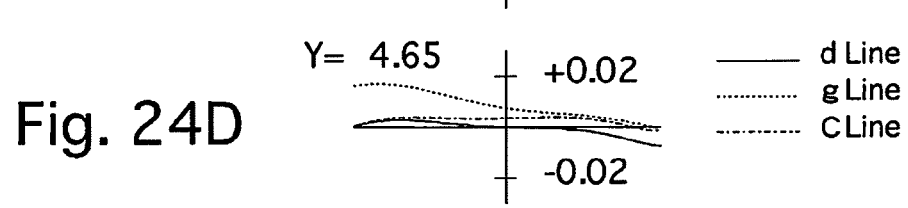

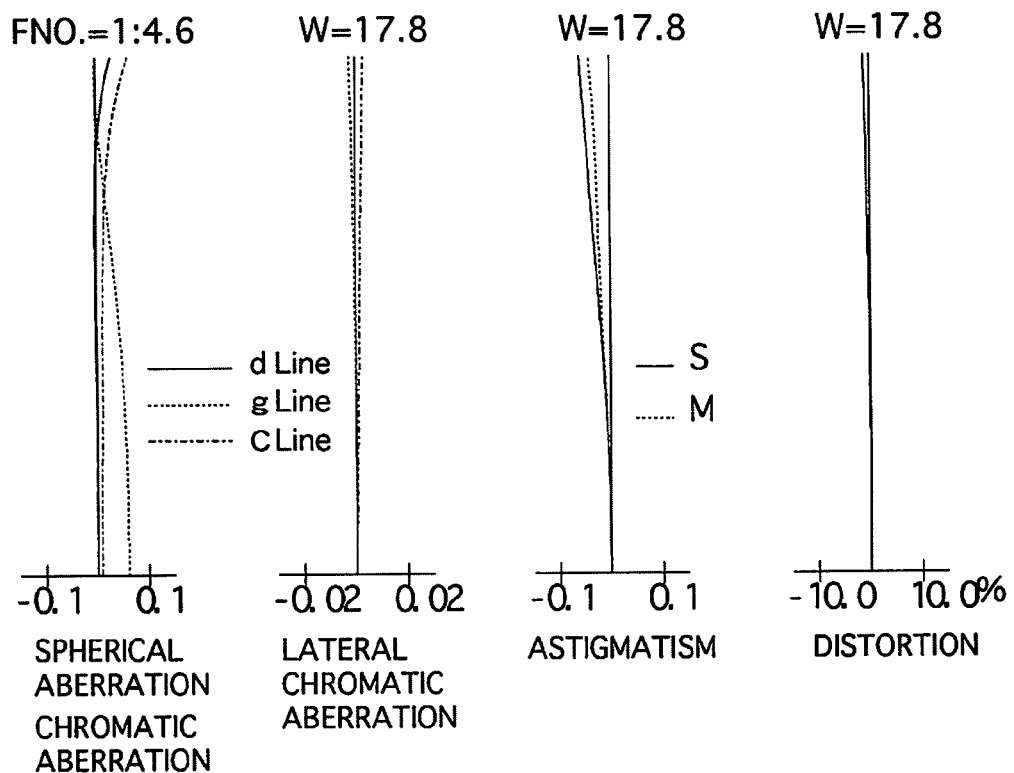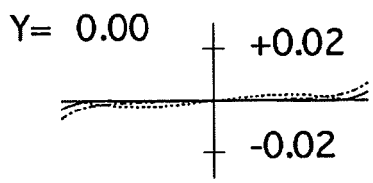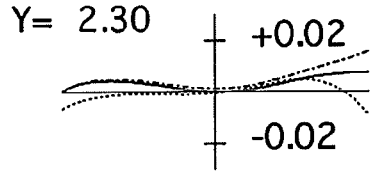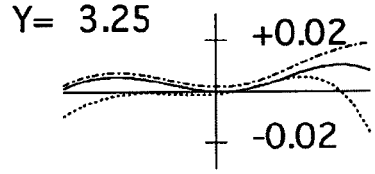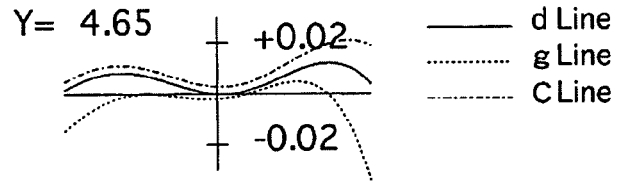

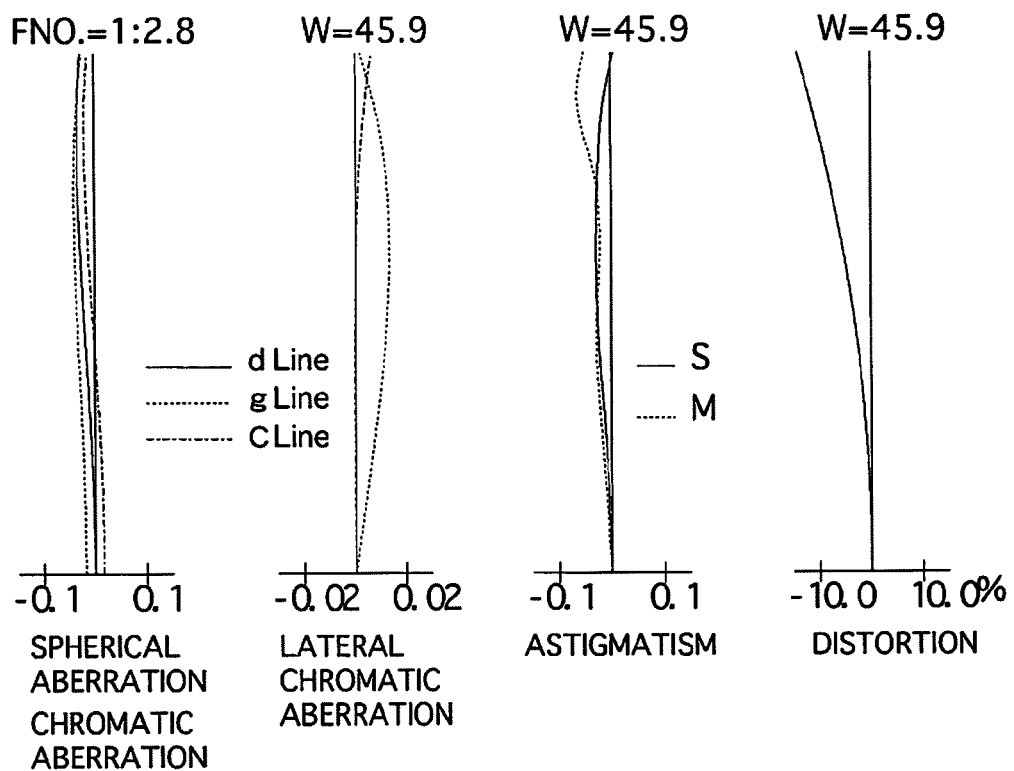
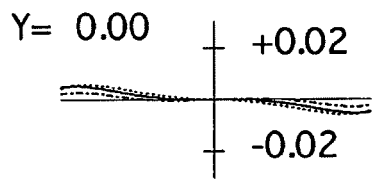
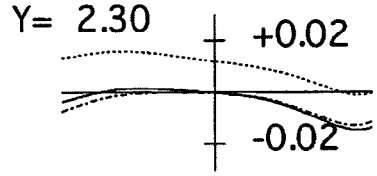
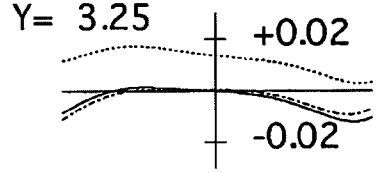
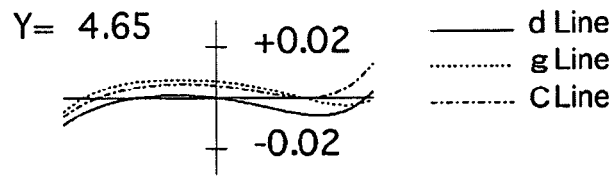

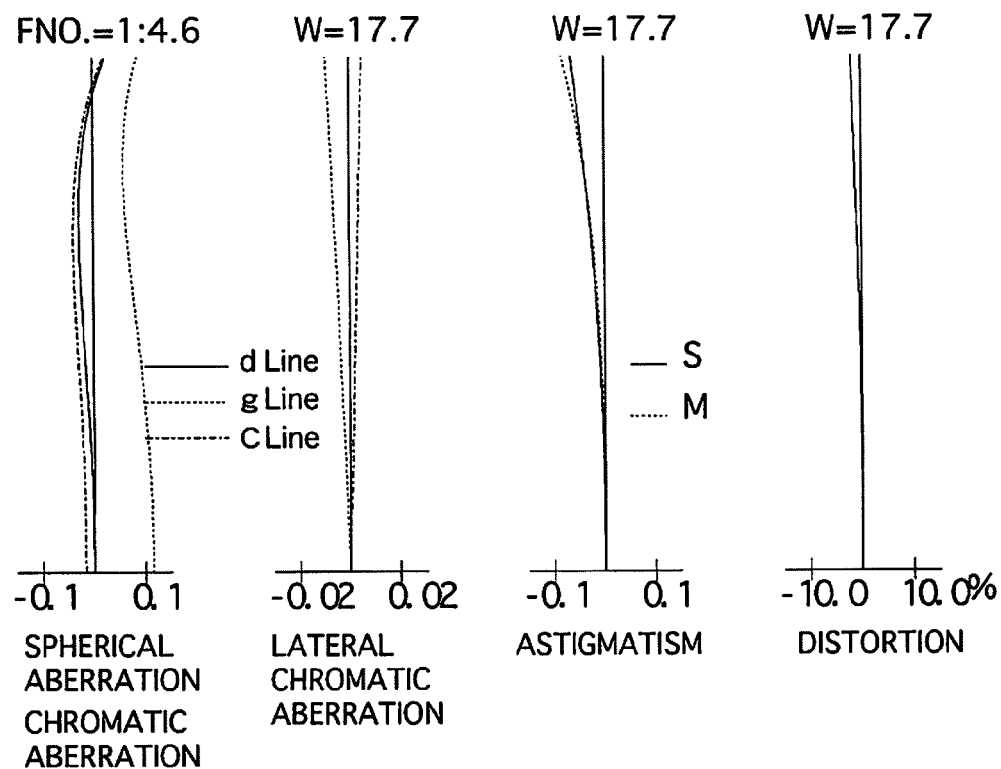
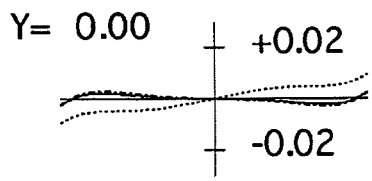
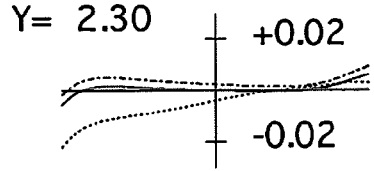
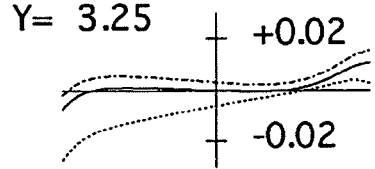
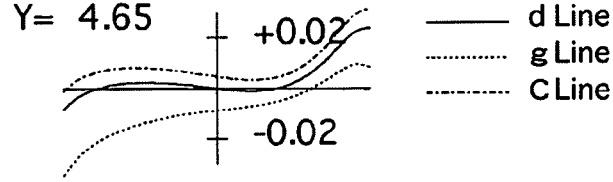

ZOOM LENS SYSTEM AND OPTICAL INSTRUMENT USING THE SAME

BACKGROUND OF THE INVENTION

1. Field of the Invention

The present invention relates to a zoom lens system that is suitable for use in an optical instrument such as a digital camera, etc.

2. Description of Related Art

In recent years there has been an increasing need for a zoom lens system in an optical instrument such as a digital camera, etc., to be more compact (miniaturized) and to have a higher optical quality. There is also a very strong demand for miniaturization of the focusing mechanism system and for a rapid focusing operation.

Photographing lens systems which include a wide angle-of-view and are configured of a negative first lens group, a positive second lens group, and a positive third lens group, in that order from the object side, i.e., three lens groups, are known in the art (Japanese Unexamined Patent Publication Nos. H08-304704, 2000-131611, 2004-85600, 2005-181851, 2005-181852 and 2010-204647).

In the photographing lens system disclosed in Japanese Unexamined Patent Publication Nos. 2000-131611 and 2004-85600, a front-focusing method is employed to carry-out a focusing operation by moving the entire first lens group in the optical axis direction. However, in such a front focusing method, if the weight of the first lens group, which constitutes a focusing lens group, is large (if the number of lens elements in the first lens group is large), the motor/actuator that constitutes the focusing mechanism system is also enlarged. Accordingly, the diameter of the lens barrel (which includes the zoom lens system of the present invention and the motor/actuator) is enlarged, thereby enlarging the entire zoom lens system.

In Japanese Unexamined Patent Publication Nos. 2005-181851 and 2005-181852, both the second and third lens groups are moved in the optical axis direction to carry out a focusing operation. However, since two lens groups are used as a focusing lens group, the weight of the focusing lens group increases, so that the motor/actuator that constitutes the focusing mechanism system is also enlarged.

Japanese Unexamined Patent Publication Nos. H08-304704 and 2010-204647 employ an internal focusing system in which focusing is carried out by moving the second lens group in the optical axis direction. However, the burden on the motor/actuator that constitutes the focusing mechanism system is still great, and cannot sufficiently cope with a rapid focusing operation.

Furthermore, in each of the zoom lens system disclosed in Japanese Unexamined Patent Publication Nos. H08-304704, 2000-131611, 2004-85600 and 2010-204647, the zoom ratio is less than 2:1, which is insufficient.

Furthermore, in each of the Japanese Unexamined Patent Publication Nos. H08-304704, 2000-131611, 2004-85600, 2005-181851, 2005-181852 and 2010-204647, the air-distance between the surface closest to the image side of the first lens group to the surface closest to the object side of the second lens group is larger than the air-distance between the surface closest to the image side of the second lens group to the surface closest to the object side of the third lens group, at a minimum focal length (short focal length extremity). Accordingly, the axial light rays within the second lens group, which are incident on the second lens group upon diverging from the first lens group, become too high, so that aberration fluctuations, especially fluctuations in spherical aberration and distortion, occur during a focusing operation.

SUMMARY OF THE INVENTION

The present invention has been devised with consideration of the above-described problems and provides a zoom lens system which is compact (miniaturized) while achieving a zoom ratio of approximately 2.9:1, achieves miniaturization of the focusing mechanism system, achieves a rapid focusing operation, and spherical aberration and distortion can be favorably corrected during a focusing operation at the short focal length extremity; the present invention also provides an optical instrument which uses such a zoom lens system.

According to an aspect of the present invention, a zoom lens system is provided, including a negative first lens group, a positive second lens group, and a positive third lens group, in that order from the object side, wherein the second lens group constitutes a focusing lens group that is moved in the optical axis direction during a focusing operation. The following conditions (1) and (2) are satisfied:

$$0.4 < |d12w/f1| < 1.0 \tag{1}$$

and $$d12w < d23w \tag{2},$$

wherein f1 designates the focal length of the first lens group, d12w designates the air-distance between the surface closest to the image side of the first lens group to the surface closest to the object side of the second lens group at the short focal length extremity, and d23w designates the air-distance between the surface closest to the image side of the second lens group to the surface closest to the object side of the third lens group at the short focal length extremity.

It is desirable for the following condition (3) to be satisfied:

$$1.5 < m2w < 2.3 \tag{3},$$

wherein m2w designates the lateral magnification of the second lens group when focused on an object at infinity at the short focal length extremity.

It is desirable for the following condition (4) to be satisfied:

$$-1 < SF < 0 \tag{4},$$

wherein SF=(R2F−R2R)/(R2F+R2R), R2F designates the radius of curvature of the surface closest to the object side within the second lens group, and R2R designates the radius of curvature of the surface closest to the image side within the second lens group.

It is further desirable for the following condition (4') to be satisfied:

$$-0.8 < SF < -0.4 \tag{4'}.$$

It is desirable for the second lens group to be a positive single lens element.

It is desirable for at least one aspherical-surfaced lens element to be provided in each of the first lens group and the third lens group.

It is desirable for the first lens group to be configured of at least two negative lens elements that each has a concave surface on the image side. For example, the first lens group can be configured of three negative lens element which each has a concave surface on the image side. Each of the negative lens element which each has a concave surface on the image side can be a negative meniscus lens element having a concave surface on the image side or a biconcave negative lens element.

It is desirable for the third lens group to be configured of at least three positive lens elements.

It is desirable for a diaphragm to be provided in between the second lens group and the third lens group.

In an embodiment, an optical instrument is provided, including an image sensor that electronically converts an image that is formed through the above-described zoom lens system into a signal.

According to the present invention, a zoom lens system is achieved, which is compact (miniaturized) while achieving a zoom ratio of approximately 2.9:1, achieves miniaturization of the focusing mechanism system, achieves a rapid focusing operation, and spherical aberration and distortion can be favorably corrected during a focusing operation at the short focal length extremity; an optical instrument which uses such a zoom lens system is also achieved.

The present disclosure relates to subject matter contained in Japanese Patent Application No. 2011-120495 (filed on May 30, 2011) which is expressly incorporated herein in its entirety.

BRIEF DESCRIPTION OF THE DRAWINGS

The present invention will be discussed below in detail with reference to the accompanying drawings, in which:

FIGS. 5A, 5B, 5C and 5D show various aberrations that occurred in the lens arrangement shown in FIG. 4;

FIGS. 6A, 6B, 6C and 6D show lateral aberrations that occurred in the lens arrangement shown in FIG. 4;

FIGS. 8A, 8B, 8C and 8D show various aberrations that occurred in the lens arrangement shown in FIG. 7;

FIGS. 9A, 9B, 9C and 9D show lateral aberrations that occurred in the lens arrangement shown in FIG. 7;

FIGS. 11A, 11B, 11C and 11D show various aberrations that occurred in the lens arrangement shown in FIG. 10;

FIGS. 12A, 12B, 12C and 12D show lateral aberrations that occurred in the lens arrangement shown in FIG. 10;

FIGS. 17A, 17B, 17C and 17D show various aberrations that occurred in the lens arrangement shown in FIG. 16;

FIGS. 18A, 18B, 18C and 18D show lateral aberrations that occurred in the lens arrangement shown in FIG. 16;

FIGS. 23A, 23B, 23C and 23D show various aberrations that occurred in the lens arrangement shown in FIG. 22;

FIGS. 24A, 24B, 24C and 24D show lateral aberrations that occurred in the lens arrangement shown in FIG. 22;

FIGS. 26A, 26B, 26C and 26D show various aberrations that occurred in the lens arrangement shown in FIG. 25;

FIGS. 27A, 27B, 27C and 27D show lateral aberrations that occurred in the lens arrangement shown in FIG. 25;

FIGS. 29A, 29B, 29C and 29D show various aberrations that occurred in the lens arrangement shown in FIG. 28;

FIGS. 30A, 30B, 30C and 30D show lateral aberrations that occurred in the lens arrangement shown in FIG. 28;

FIGS. 38A, 38B, 38C and 38D show various aberrations that occurred in the lens arrangement shown in FIG. 37;

FIGS. 39A, 39B, 39C and 39D show lateral aberrations that occurred in the lens arrangement shown in FIG. 37;

DESCRIPTION OF THE EMBODIMENTS

Figure 43:
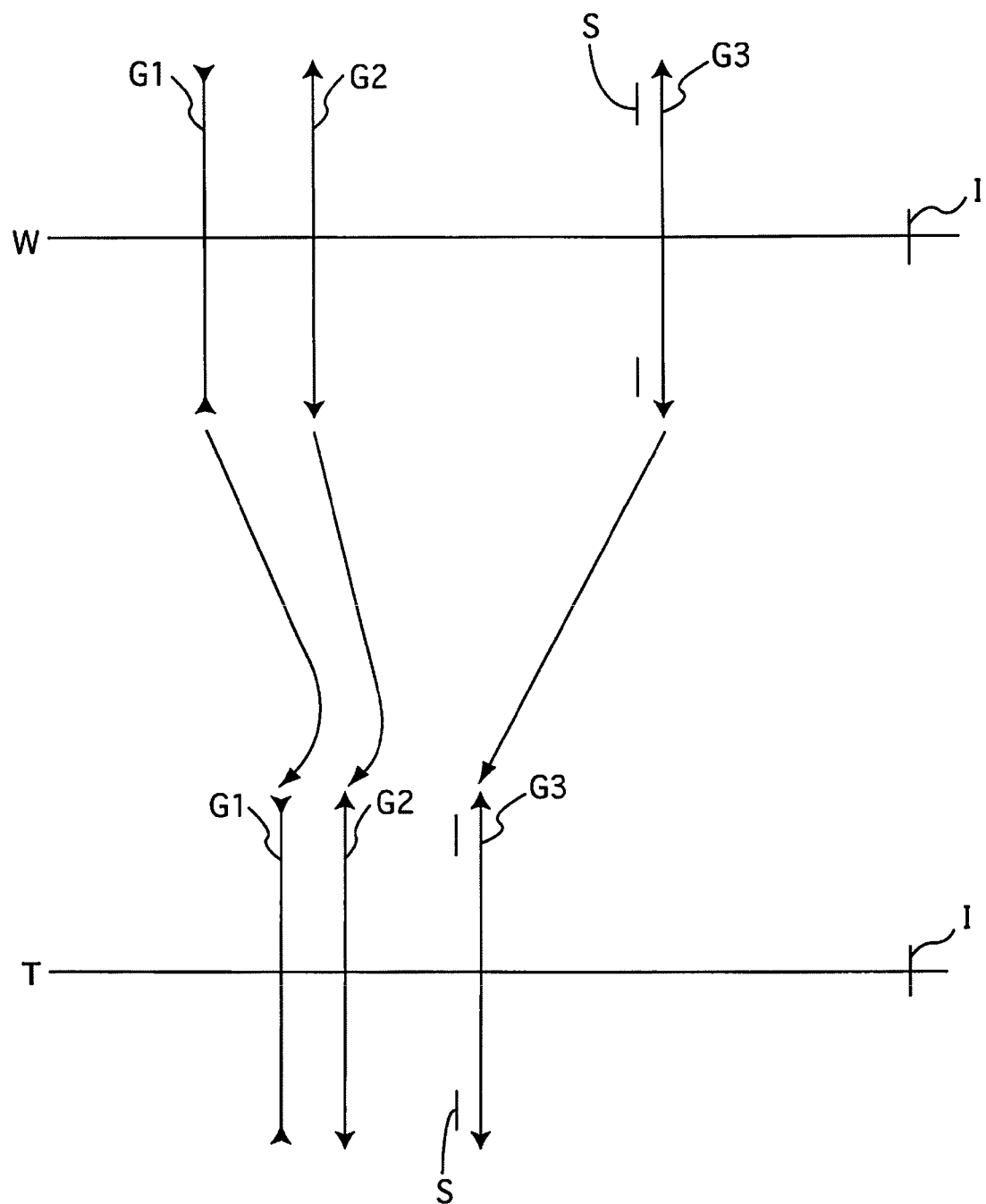
FIG. 43 shows a zoom path of the zoom lens system according to the present invention.

The zoom lens system of the illustrated embodiments, as shown in the zoom path of FIG. 43, is configured of a negative first lens group G1, a positive second lens group G2 and a positive third lens group G3, in that order from the object side. A diaphragm S which is provided between the second lens group G2 and the third lens group G3 moves integrally with the third lens group G3 in the optical axis direction. 'I' designates the imaging plane.

In the zoom lens system of the present invention, upon zooming from the short focal length extremity (W) to the long focal length extremity (T), the first through third lens groups G1 through G3 move in the optical axis direction so that the distance between the first lens group G1 and the second lens group G2 decreases and the distance between the second lens group G2 and the third lens group G3 decreases.

More specifically, upon zooming from the short focal length extremity (W) to the long focal length extremity (T), the first lens group G1 first moves toward the image side and thereafter moves by a slight amount toward the object side (thereby moving toward the image side as a whole), the second lens group G2 first moves toward the image side and thereafter moves by a slight amount toward the object side (thereby moving toward the image side as a whole), and the third lens group G3 moves monotonically toward the object side.

In each of the first through fourth, sixth and seventh numerical embodiments, the first lens group G1 is configured of three negative lens elements (negative lens elements each having a concave surface on the image side) 11, 12 and 13. The negative lens element 11 that is provided closest to the object side is a hybrid lens configured of a glass lens element having an aspherical layer, formed by a compound resin material, bonded to the image side thereof.

In the fifth numerical embodiment, the first lens group G1 is configured of two negative lens elements (negative lens elements each having a concave surface on the image side) 11' and 12'. The negative element 11' on the object side has an aspherical surface on the image side thereof.

In each of the first through seventh numerical embodiments, the second lens group G2 is configured of a positive single lens element 21. The positive single lens element 21 (second lens group G2) constitutes a focusing lens group that is moved in the optical axis direction during a focusing operation. Namely, when focusing on an object at infinity through to an object at a finite distance, focusing is carried out by moving the positive single lens element 21 (second lens group G2) toward the image side.

In each of the first through seventh numerical embodiments, the third lens group G3 is configured of a positive lens element 31, a cemented lens formed by a positive lens element 32 and a negative lens element 33; and a positive lens element 34, in that order from the object side. Each of the positive lens elements 31 and 34 has an aspherical surface on each side thereof.

In the illustrated embodiments, in order to achieve a negative refractive power in the zoom lens system while suppressing occurrence of distortion, the first lens group G1 is configured of the three negative lens elements (negative lens elements each having a concave surface on the image side) 11, 12 and 13, or the two negative lens elements (negative lens elements each having a concave surface on the image side) 11' and 12', and the second lens group G2 is configured of the positive single lens element 21.

In order to suppress distortion, it is effective to provide a positive lens element (having a convex surface on the object side) at a location that is closest to the object side within the first lens group. However, if such a positive lens element (having a convex surface on the object side) is provided at a location that is closest to the object side, the maximum diameter of the first lens group becomes too large, thereby increasing the overall size of the entire zoom lens system.

Therefore, in the illustrated embodiments, by arranging the first lens group G1 so as to be configured of the three negative lens elements (negative lens elements each having a concave surface on the image side) 11, 12 and 13, or the two negative lens elements (negative lens elements each having a concave surface on the image side) 11' and 12', and by including a lens element (aspherical-surface lens element) that has at least one aspherical surface within the first lens group G1, enlargement of the first lens group G1 can be prevented, and occurrence of distortion is successfully suppressed.

From a viewpoint of cost, it is advantageous for the aspherical-surface lens element within the first lens group G1 to be located closest to the image side so as to have the smallest diameter (i.e., the negative lens element 13 or the negative lens element 12'); however, there is, nevertheless, the disadvantage of aberration correction being insufficient since the lens diameter (of the aspherical-surface lens element) is small.

To solve this problem, the illustrated embodiments achieve favorable aberration correction by configuring the lens element (negative lens element 11 or 11') that is provided closest to the object side within the first lens group G1 as the aspherical-surface lens element. In the case where the negative lens element 11 or 11' that is provided closest to the object side within the first lens group G1 is configured as the aspherical-surface lens element, in view of the manufacturing costs, it is desirable to form the negative lens element 11 or 11' as a hybrid lens configured of a glass lens element having an aspherical layer, formed by a compound resin material. Furthermore, if the aspherical surface (of the negative lens element 11 or 11') that is included within the first lens group G1 is formed such that the negative refractive power thereof increasingly weakens (the positive refractive power increasingly strengthens) from the optical axis toward the outer periphery compared to the paraxial spherical surface thereof, positive distortion occurs at this aspherical surface to thereby favorably correct the negative distortion that prominently occurs at the first lens group G1.

The positive single lens element 21 of the second lens group G2 constitutes a focusing lens group that is moved in the optical axis direction during a focusing operation, and also functions to prevent fluctuation in distortion, spherical aberration and coma during a focusing operation.

In the illustrated embodiments, by providing the positive single lens element (focusing lens group) 21 at a position as far away from the third lens group G3 (and the diaphragm S) as possible (at a position close to the first lens group G1), the sensitivity with respect to aberration fluctuations during movement (of the focusing lens group, i.e., the positive single lens element 21) in the optical axis direction, especially the sensitivity with respect to fluctuations in spherical aberration and distortion, can be successfully suppressed to a low level.

Furthermore, by arranging the focusing lens group so as to be configured of the positive single lens element 21, the weight of the focusing lens group can be reduced, and the motor/actuator that constitutes the focusing mechanism system can be miniaturized. Accordingly, the maximum diameter of the lens barrel (which includes the zoom lens system of the present invention) can be reduced and the entire zoom lens system can also be miniaturized. Moreover, a rapid focusing operation can also be achieved.

In the illustrated embodiments, by including at least one negative lens element (the negative lens element 33), which generates negative spherical aberration within the third lens group G3, spherical aberrations that occur over the entire zoom lens system can be favorably corrected while retaining a minimal influence on the abaxial aberration. Furthermore, by including at least three positive lens elements (the positive lens elements 31, 32 and 34) within the third lens group G3, occurrence of spherical aberration and coma can be suppressed. Furthermore, by bonding the negative lens element provided within the second lens group G2 with one positive lens element (i.e., bonding the positive lens element 32 with the negative lens element 33), high-order spherical aberrations can also be favorably corrected.

Conditions (1) and (2) each concerns correction of aberrations via the light rays from the first lens group G1 that are incident on the second lens group G2. By satisfying conditions (1) and (2), light rays from the first lens group G1 can be made incident onto the second lens group G2 without diverging very much, and the height of the axial light rays can be lowered within the second lens group G2, thereby favorably correcting spherical aberration and distortion during a focusing operation at the short focal length extremity.

Condition (1) specifies the ratio of the focal length of the first lens group G1 to the air-distance between the surface closest to the image side of the first lens group G1 to the surface closest to the object side of the second lens group G2, at the short focal length extremity.

If the upper limit of condition (1) is exceeded, the negative refractive power of the first lens group G1 becomes too strong, so that correction of distortion and astigmatism becomes difficult.

If the lower limit of condition (1) is exceeded, the negative refractive power of the first lens group G1 becomes too weak, so that the diameter of the positive single lens element 21 that constitutes the focusing lens group is enlarged, thereby enlarging the entire zoom lens system.

Condition (2) specifies the air-distance between the surface closest to the image side of the first lens group G1 to the surface closest to the object side of the second lens group G2 so as to be shorter than the air-distance between the surface closest to the image side of the second lens group G2 to the surface closest to the object side of the third lens group G3, at the short focal length extremity. By satisfying condition (2), the second lens group G2 and the third lens group G3 become sufficiently apart from each other at the short focal length extremity, the height of the axial light rays that pass through the second lens group G2 is lowered, and spherical aberration and distortion can be favorably corrected during a focusing operation at the short focal length extremity.

If condition (2) is not satisfied, the height of the axial rays that pass through the second lens group G2 become too high, and the correction of spherical aberration during a focusing operation becomes insufficient at the short focal length extremity.

Condition (3) specifies the lateral magnification of the second lens group G2 when focused on an object at infinity at the short focal length extremity. By satisfying condition (3), the amount of movement of the second lens group G2 in the optical axis direction during a focusing operation can be reduced, thereby miniaturizing the entire zoom lens system while favorably correcting spherical aberration and coma during a focusing operation.

If the upper limit of condition (3) is exceeded, since the refractive power of the second lens group G2 becomes strong, although the amount of movement of the second lens group G2 during a focusing operation can be reduced, fluctuations during a focusing operation, especially spherical aberration and coma fluctuations, increase.

If the lower limit of condition (3) is exceeded, the refractive power of the second lens group G2 becomes too weak, so that the amount of movement of the second lens group G2 during a focusing operation needs to be increased, thereby increasing the overall length of the zoom lens system and increasing the minimum focal distance (the minimum focal length).

As described above, in each of the first through seventh numerical embodiments, the second lens group G2 that constitutes the focusing lens group is configured of the positive single lens element 21. However, it is acceptable to concentrate on the lens surface that is closest to the object side of the second lens group G2 and the lens surface that is closest to the image side of the second lens group G2, without considering whether the second lens group G2 is formed from a single lens element, so long as the entire second lens group G2 constitutes a positive meniscus lens shape having a convex surface on the object side. If the problems of weight and manufacturing costs can be avoided, it is of course possible to configure the second lens group G2 of two or more lens elements. For example, at the design stage of the zoom lens system, the positive single lens element 21 can be separated into two lens elements at approximately the center with respect to the optical axis direction, and it would be easy for one skilled in the art to adjust the radius of curvature of the separating surfaces while making additions for the thickness of each of the two lens elements and the distance therebetween with consideration of the manufacturing conditions. The present invention is essentially directed to the second lens group G2 being formed, as a whole, as a meniscus shape having a convex surface on the object side, and is not directed to whether the number of lens elements is one or two.

Condition (4) is directed to the lens surface that is closest to the object side of the second lens group (the focusing lens group) G2 and the lens surface that is closest to the image side of the second lens group (the focusing lens group) G2, and specifies the second lens group G2, as whole, as a positive meniscus shape having a convex surface on the object side. By satisfying condition (4), abaxial astigmatism can be favorably suppressed at the short focal length extremity.

If the upper limit of condition (4) is exceeded, the radius of curvature of the surface closest to the object side of the second lens group G2 becomes larger than that of the surface closest to the image side of the second lens group G2, so that the balance of the correction of coma aberration, which fluctuates during a focusing operation, is lost.

If the lower limit of condition (4) is exceeded, the radius of curvature of the surface closest to the object side of the second lens group G2 reaches infinity (a plane surface) or a negative value (a convex surface on the image side), so that correction of astigmatism at the short focal length extremity becomes difficult. Furthermore, correction of field curvature becomes insufficient.

Furthermore, by configuring the second lens group G2, as a whole, as a meniscus shape having a convex surface on the object side that satisfies condition (4'), fluctuations in coma, astigmatism and field curvature during a focusing operation and during zooming can be favorably corrected.

EMBODIMENTS

Specific numerical embodiments (first through seventh numerical embodiments) will be herein discussed. In the various aberration diagrams, lateral aberration diagrams and the tables, the d-line, g-line and the C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
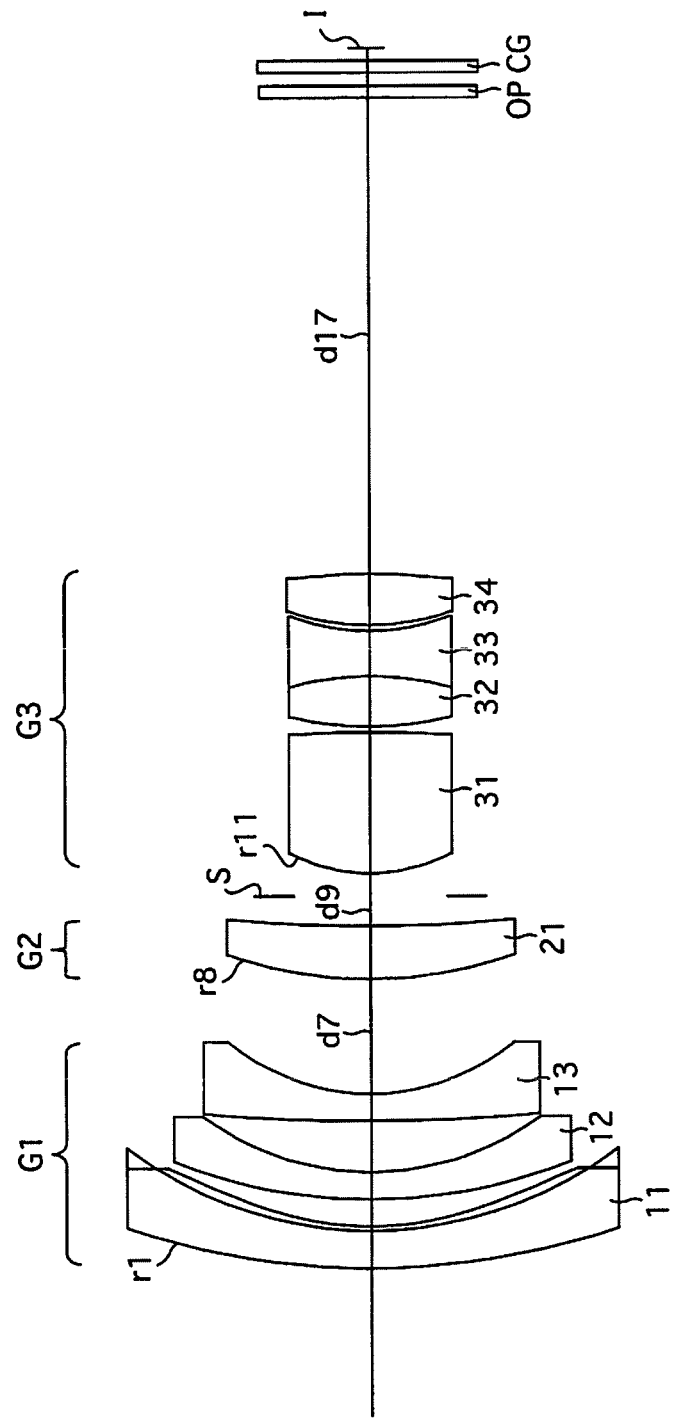
FIG. 1 shows a lens arrangement of a first numerical embodiment of a zoom lens system, according to the present invention, at the long focal length extremity when focused on an object at infinity.
Figures 2A, 2B, 2C, 2D:
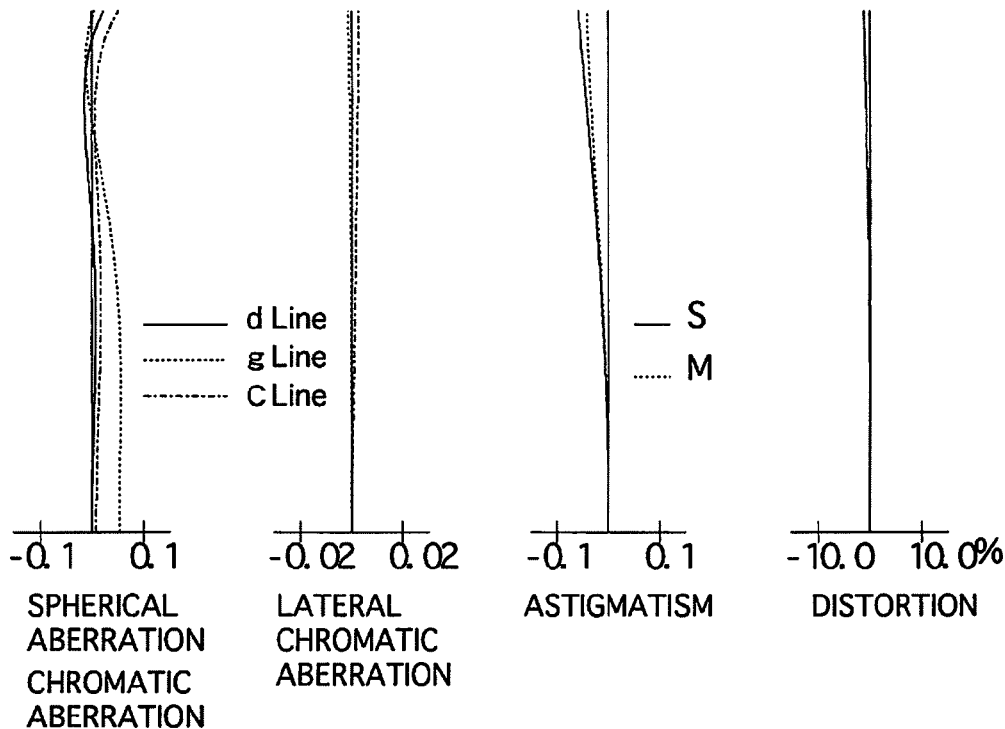
FIGS. 2A, 2B, 2C and 2D show various aberrations that occurred in the lens arrangement shown in FIG. 1.
Figure 3A:
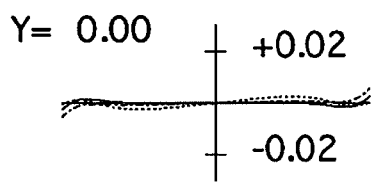
FIGS. 3A, 3B, 3C and 3D show lateral aberrations that occurred in the lens arrangement shown in FIG. 1.
Figure 3B:
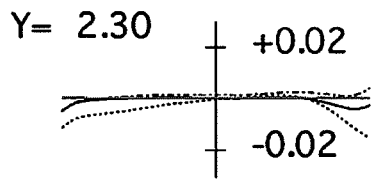
Figure 3C:
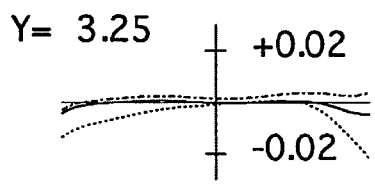
Figure 3D:
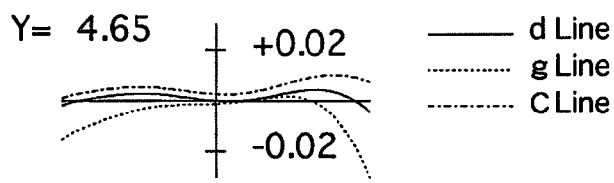
Figure 4:
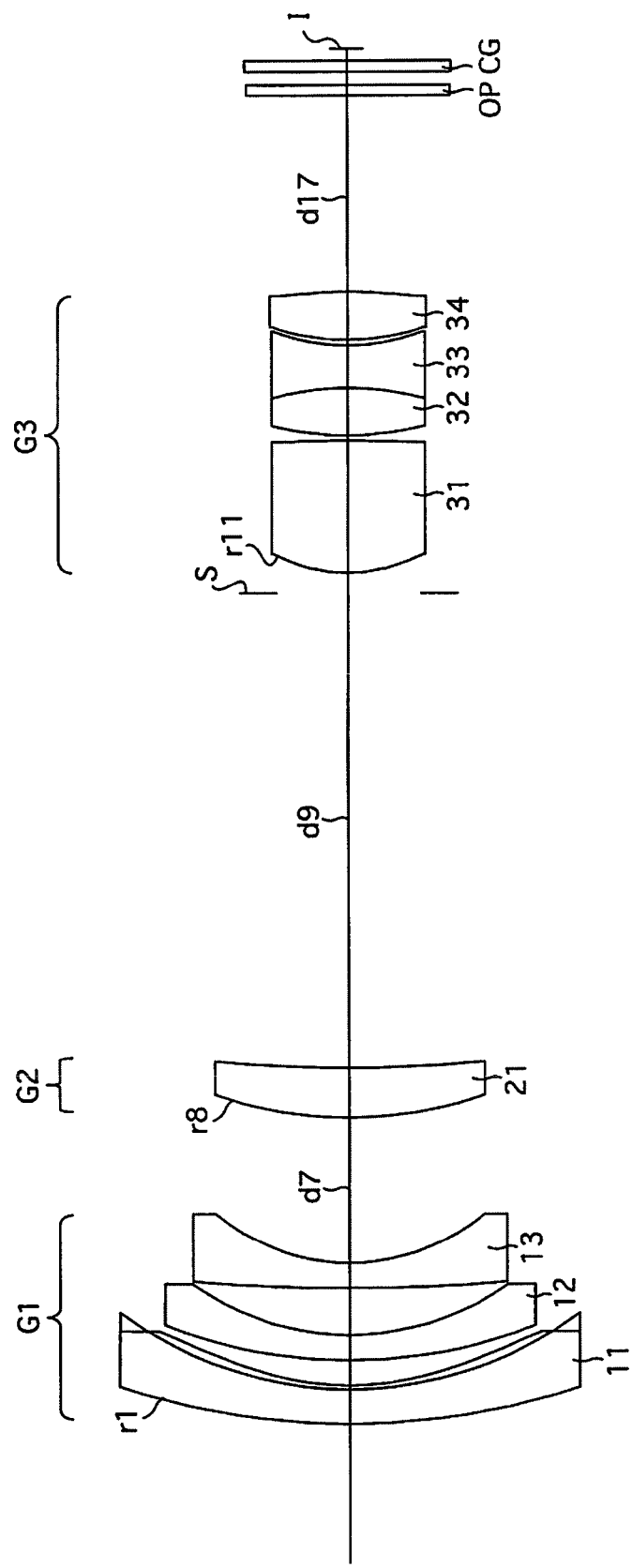
FIG. 4 shows a lens arrangement of the first numerical embodiment of the zoom lens system, according to the present invention, at the short focal length extremity when focused on an object at infinity.

FIGS. 1 through 6D and Tables 1 through 4 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. FIG. 4 shows a lens arrangement of the first numerical embodiment of the zoom lens system at the short focal length extremity when focused on an object at infinity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. Table 1 shows the lens surface data, Table 2 shows various data of the zoom lens system, Table 3 shows the aspherical surface data, and Table 4 shows various data of the lens groups according to the first numerical embodiment of the present invention.

The zoom lens system of the present invention is configured of a negative first lens group G1, a positive second lens group G2 and a positive third lens group G3, in that order from the object side.

The first lens group G1 is configured of a negative meniscus lens element 11 having a convex surface on the object side, a negative meniscus lens element 12 having a convex surface on the object side, and a negative meniscus lens element 13 having a convex surface on the object side, in that order from the object side. The negative meniscus lens element 11 that is provided closest to the object side within the first sub-lens group G1 is a hybrid lens configured of a glass lens element having an aspherical layer, formed by a compound resin material, bonded to the image side thereof.

The second lens group G2 is configured of a positive meniscus single lens element 21 having a convex surface on the object side. The positive meniscus single lens element 21 (second lens group G2) constitutes a focusing lens group which is moved in the optical axis direction during a focusing operation. In other words, upon carrying out a focusing operation so as to focus on an object at infinity through to an object at a finite distance, the positive meniscus single lens element 21 (second lens group G2) is moved in the optical axis direction toward the image side.

The third lens group G3 is configured of a biconvex positive lens element 31, a cemented lens having a biconvex positive lens element 32 and a biconcave negative lens element 33; and a biconvex positive lens element 34, in that order from the object side. Each of the biconvex positive lens elements 31 and 34 is provided with an aspherical surface on each side thereof. A diaphragm S which is provided in between the second lens group G2 and the third lens group G3 moves integrally with the third lens group G3 in the optical axis direction. An optical filter OP and a cover glass CG are positioned behind the third lens group G3 (the biconvex positive lens element 34) (in between the third lens group G3 and the imaging plane I).

TABLE 1

SURFACE DATA

| Surf. No. | r | d | N(d) | vd |
|---|---|---|---|---|
| 1 | 35.132 | 1.637 | 1.77250 | 49.6 |
| 2 | 18.306 | 0.200 | 1.52972 | 42.7 |
| 3* | 13.856 | 1.200 | | |
| 4 | 24.439 | 1.200 | 1.80420 | 46.5 |
| 5 | 12.884 | 2.273 | | |
| 6 | 88.391 | 1.200 | 1.74930 | 51.1 |
| 7 | 10.266 | d7 | | |
| 8 | 20.063 | 2.343 | 1.84666 | 23.8 |
| 9 | 67.827 | d9 | | |
| 10(Diaphragm) | ∞ | 1.000 | | |
| 11* | 7.723 | 6.242 | 1.49283 | 82.7 |
| 12* | −51.491 | 0.256 | | |
| 13 | 15.679 | 2.216 | 1.49700 | 81.6 |
| 14 | −14.245 | 2.020 | 1.83400 | 37.3 |
| 15 | 10.242 | 0.271 | | |
| 16* | 13.326 | 2.256 | 1.51885 | 65.8 |
| 17* | −19.493 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 2

ZOOM LENS SYSTEM DATA
Zoom Ratio: 2.88

|  | Short Focal Length Extremity | Intermediate Focal Length | Long Focal Length Extremity |
|---|---|---|---|
| FNO. | 2.8 | 3.7 | 4.6 |
| f | 5.14 | 10.00 | 14.83 |
| W | 45.9 | 25.5 | 17.6 |
| Y | 4.65 | 4.65 | 4.65 |
| fB | 0.53 | 0.53 | 0.53 |
| L | 65.00 | 53.78 | 53.88 |
| d7 | 6.822 | 5.367 | 5.091 |
| d9 | 22.449 | 6.704 | 1.333 |
| d17 | 9.264 | 15.248 | 20.989 |

TABLE 3

Aspherical Surface Data (the aspherical surface coefficients not indicated are zero (0.00)):

| Surf. No. | K | A4 | A6 | A8 |
|---|---|---|---|---|
| 3 | 0.000 | −0.8450E−04 | −0.5227E−06 | 0.1614E−09 |
| 11 | 0.000 | −0.6956E−04 | −0.1346E−05 |  |
| 12 | 0.000 | 0.3684E−03 | −0.7856E−05 | 0.2109E−06 |
| 16 | 0.000 | 0.5583E−03 | −0.1339E−04 |  |
| 17 | 0.000 | 0.6541E−03 | 0.7907E−05 |  |

TABLE 4

LENS GROUP DATA

| Lens Group | 1st Surf. | Focal Length |
|---|---|---|
| 1 | 1 | −7.45 |
| 2 | 8 | 32.91 |
| 3 | 11 | 14.48 |

Numerical Embodiment 2

Figure 7:
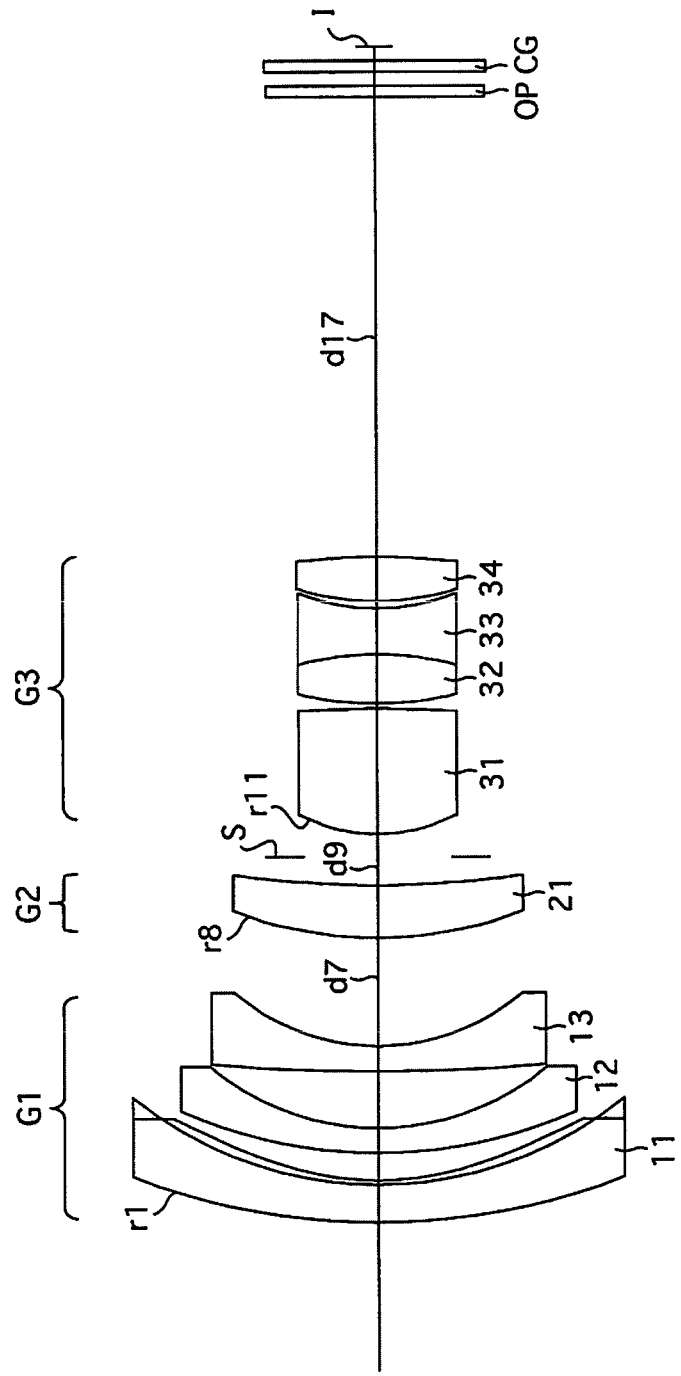
FIG. 7 shows a lens arrangement of a second numerical embodiment of a zoom lens system, according to the present invention, at the long focal length extremity when focused on an object at infinity.
Figure 10:
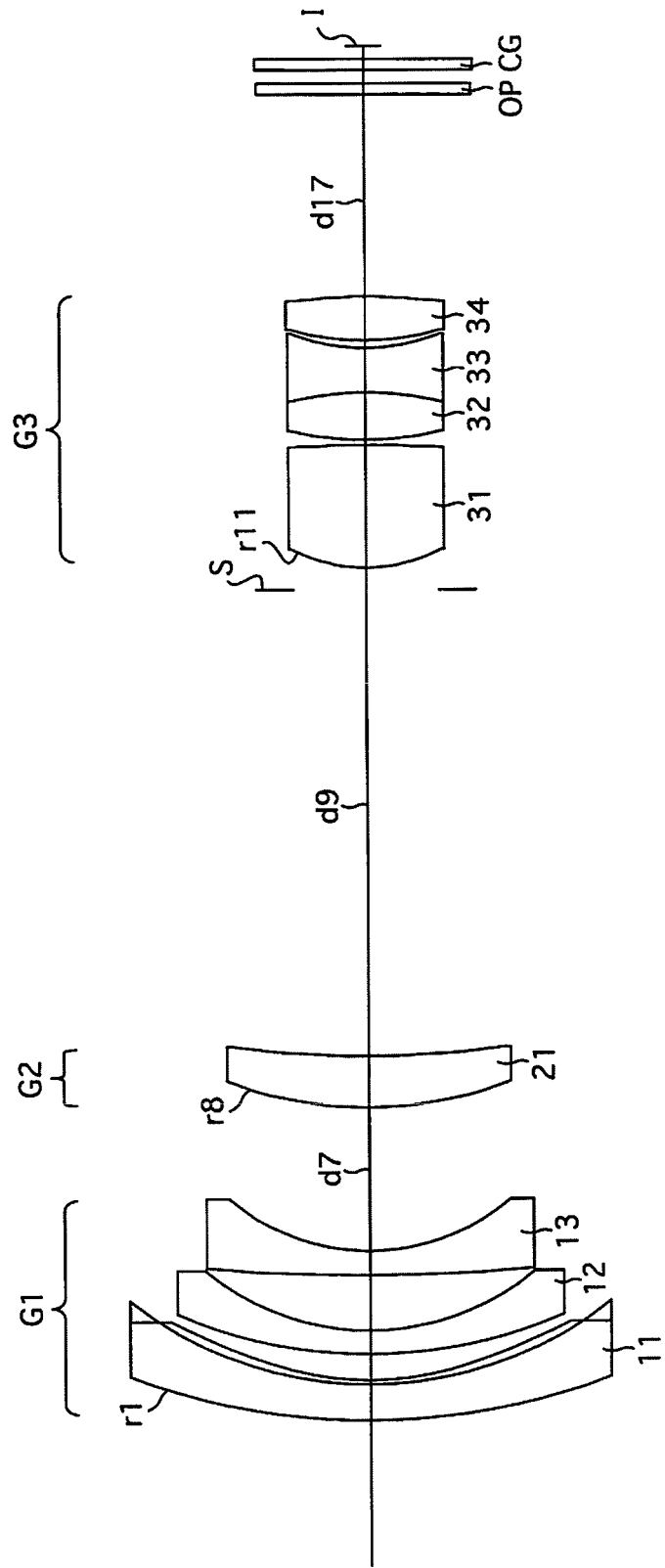
FIG. 10 shows a lens arrangement of the second numerical embodiment of the zoom lens system, according to the present invention, at the short focal length extremity when focused on an object at infinity.

FIGS. 7 through 12D and Tables 5 through 8 show a second numerical embodiment of a zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. FIG. 10 shows a lens arrangement of the second numerical embodiment of the zoom lens system at the short focal length extremity when focused on an object at infinity. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. Table 5 shows the lens surface data, Table 6 shows various data of the zoom lens system, Table 7 shows the aspherical surface data, and Table 8 shows various data of the lens groups according to the second numerical embodiment of the present invention.

The lens arrangement of the second numerical embodiment is the same as that of the first numerical embodiment.

TABLE 5

SURFACE DATA

| Surf. No. | r | d | N(d) | vd |
|---|---|---|---|---|
| 1 | 31.338 | 1.637 | 1.77250 | 49.6 |
| 2 | 17.683 | 0.200 | 1.52972 | 42.7 |
| 3* | 13.647 | 1.200 |  |  |
| 4 | 22.448 | 1.100 | 1.80400 | 46.6 |
| 5 | 11.991 | 2.493 |  |  |
| 6 | 95.478 | 1.100 | 1.69680 | 55.5 |
| 7 | 10.000 | d7 |  |  |
| 8 | 18.210 | 2.333 | 1.84666 | 23.8 |
| 9 | 47.461 | d9 |  |  |
| 10(Diaphragm) | ∞ | 1.000 |  |  |
| 11* | 7.409 | 5.525 | 1.49507 | 82.1 |
| 12* | −41.770 | 0.236 |  |  |
| 13 | 15.675 | 2.146 | 1.49700 | 81.6 |
| 14 | −14.431 | 2.020 | 1.83400 | 37.3 |
| 15 | 9.637 | 0.340 |  |  |
| 16* | 14.107 | 1.968 | 1.54939 | 62.3 |
| 17* | −19.604 | d17 |  |  |
| 18 | ∞ | 0.500 | 1.51633 | 64.1 |
| 19 | ∞ | 0.620 |  |  |
| 20 | ∞ | 0.500 | 1.51633 | 64.1 |
| 21 | ∞ | — |  |  |

The asterisk (*) designates an aspherical surface which is rotationally symmetrical with respect to the optical axis.

TABLE 6

ZOOM LENS SYSTEM DATA
Zoom Ratio: 2.87

|  | Short Focal Length Extremity | Intermediate Focal Length | Long Focal Length Extremity |
|---|---|---|---|
| FNO. | 2.8 | 3.7 | 4.6 |
| f | 5.14 | 10.00 | 14.74 |
| W | 46.0 | 25.5 | 17.7 |
| Y | 4.65 | 4.65 | 4.65 |
| fB | 0.53 | 0.53 | 0.53 |
| L | 62.06 | 51.66 | 51.77 |
| d7 | 6.497 | 5.020 | 4.786 |
| d9 | 21.017 | 6.322 | 1.248 |
| d17 | 9.095 | 14.874 | 20.293 |

TABLE 7

Aspherical Surface Data (the aspherical surface coefficients not indicated are zero (0.00)):

| Surf. No. | K | A4 | A6 | A8 |
|---|---|---|---|---|
| 3 | 0.000 | −0.7579E−04 | −0.4421E−06 | −0.6869E−09 |
| 11 | 0.000 | −0.7645E−04 | −0.1958E−05 |  |
| 12 | 0.000 | 0.4118E−03 | −0.1118E−04 | 0.2984E−06 |
| 16 | 0.000 | 0.6414E−03 | −0.2244E−04 |  |
| 17 | 0.000 | 0.7262E−03 | 0.2979E−05 |  |

TABLE 8

LENS GROUP DATA

| Lens Group | 1st Surf. | Focal Length |
|---|---|---|
| 1 | 1 | −7.61 |
| 2 | 8 | 33.67 |
| 3 | 11 | 13.83 |

Numerical Embodiment 3

Figure 13:
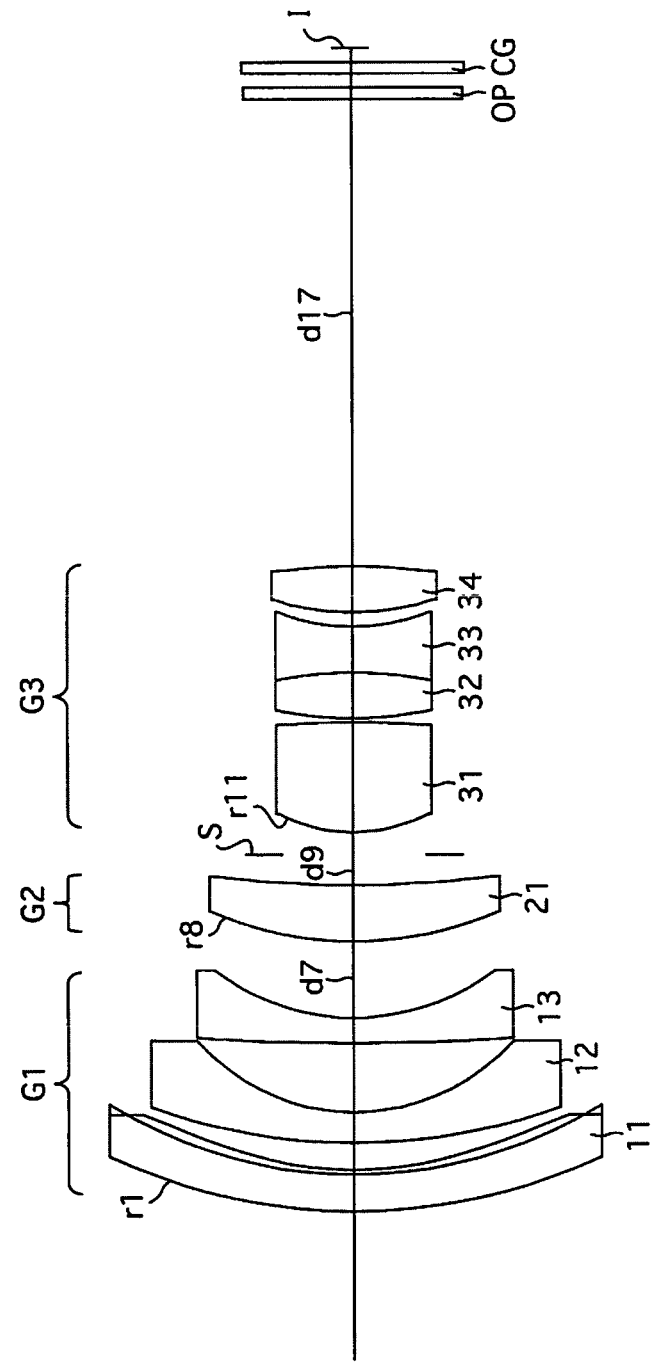
FIG. 13 shows a lens arrangement of a third numerical embodiment of a zoom lens system, according to the present invention, at the long focal length extremity when focused on an object at infinity.
Figures 14A, 14B, 14C, 14D:
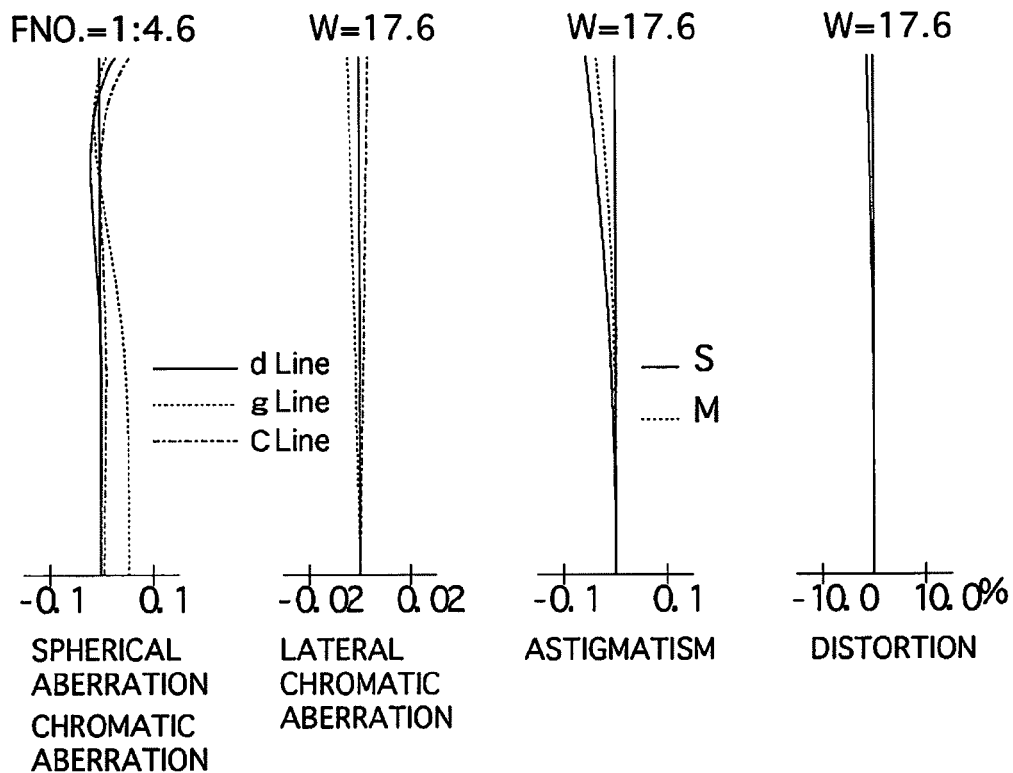
FIGS. 14A, 14B, 14C and 14D show various aberrations that occurred in the lens arrangement shown in FIG. 13.
Figure 15A:
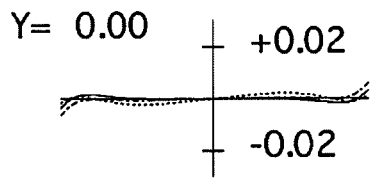
FIGS. 15A, 15B, 15C and 15D show lateral aberrations that occurred in the lens arrangement shown in FIG. 13.
Figure 15B:
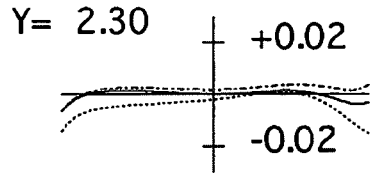
Figure 15C:
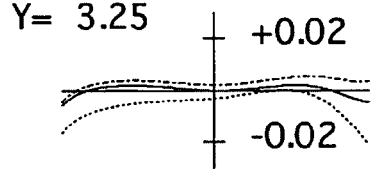
Figure 15D:
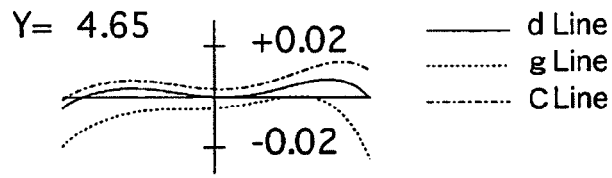
Figure 16:
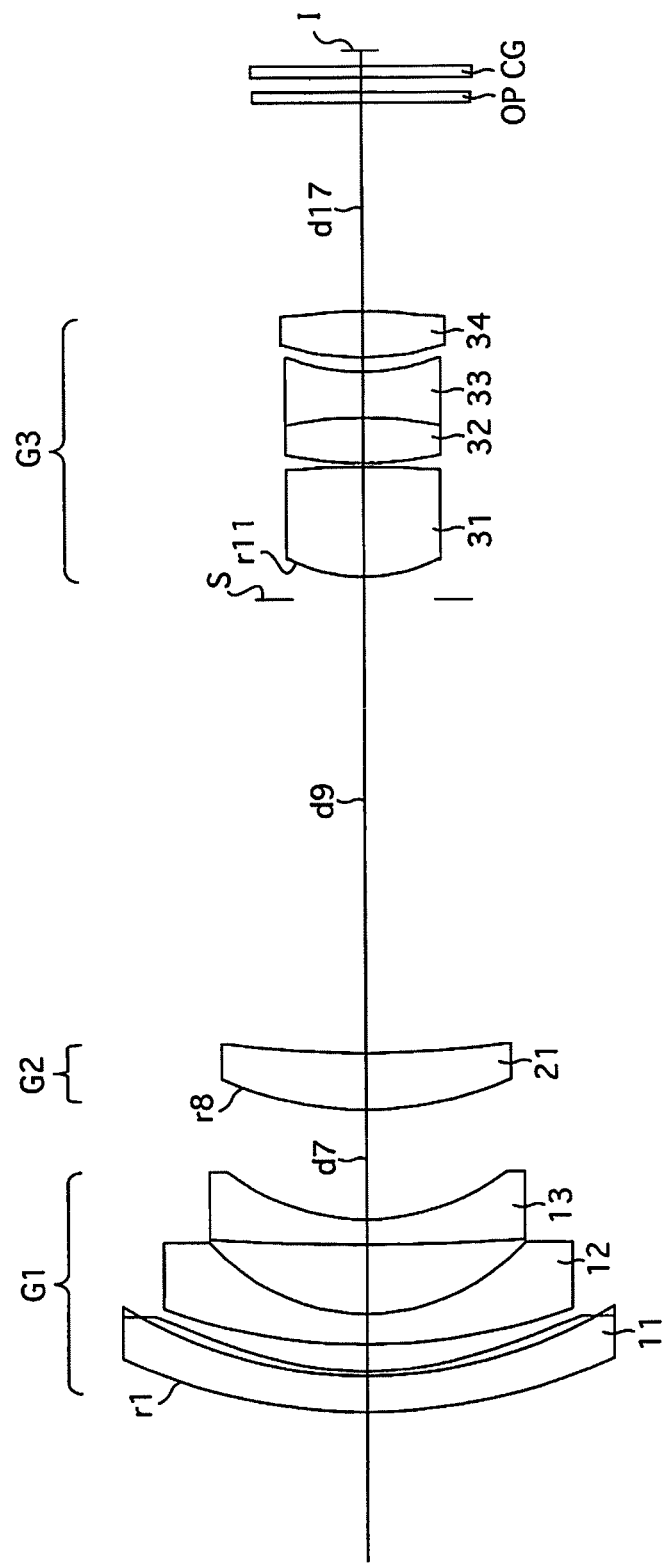
FIG. 16 shows a lens arrangement of the third numerical embodiment of the zoom lens system, according to the present invention, at the short focal length extremity when focused on an object at infinity.

FIGS. 13 through 18D and Tables 9 through 12 show a third numerical embodiment of a zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. FIG. 16 shows a lens arrangement of the third numerical embodiment of the zoom lens system at the short focal length extremity when focused on an object at infinity. FIGS. 17A, 17B, 17C and 17D show various aberrations that occurred in the lens arrangement shown in FIG. 16. FIGS. 18A, 18B, 18C and 18D show lateral aberrations that occurred in the lens arrangement shown in FIG. 16. Table 9 shows the lens surface data, Table 10 shows various data of the zoom lens system, Table 11 shows the aspherical surface data, and Table 12 shows various data of the lens groups according to the third numerical embodiment of the present invention.

The lens arrangement of the third numerical embodiment is the same as that of the first numerical embodiment.

TABLE 9

SURFACE DATA

| Surf. No. | r | d | N(d) | vd |
|---|---|---|---|---|
| 1 | 26.132 | 1.637 | 1.80400 | 41.3 |
| 2 | 21.174 | 0.200 | 1.52972 | 42.7 |
| 3* | 15.721 | 1.200 | | |
| 4 | 27.380 | 1.349 | 1.80400 | 44.2 |
| 5 | 9.537 | 3.051 | | |
| 6 | 120.978 | 1.100 | 1.69680 | 55.5 |
| 7 | 10.544 | d7 | | |
| 8 | 16.317 | 2.510 | 1.84666 | 23.8 |
| 9 | 49.115 | d9 | | |
| 10(Diaphragm) | ∞ | 1.000 | | |
| 11* | 7.355 | 4.857 | 1.49839 | 81.4 |
| 12* | −36.948 | 0.177 | | |
| 13 | 16.632 | 2.019 | 1.49700 | 81.6 |
| 14 | −17.275 | 2.020 | 1.83400 | 37.3 |
| 15 | 9.369 | 0.640 | | |
| 16* | 13.748 | 2.019 | 1.55200 | 68.6 |
| 17* | −18.593 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 10

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.8 | 3.7 | 4.6 |
| f | 5.14 | 10.01 | 14.79 |
| W | 46.1 | 25.5 | 17.6 |
| Y | 4.65 | 4.65 | 4.65 |
| fB | 0.53 | 0.53 | 0.53 |
| L | 60.03 | 50.69 | 51.26 |
| d7 | 4.828 | 3.577 | 3.373 |
| d9 | 20.076 | 6.120 | 1.343 |
| d17 | 9.198 | 15.067 | 20.615 |

TABLE 11

Aspherical Surface Data (the aspherical surface coefficients not indicated are zero (0.00)):

| Surf. No. | K | A4 | A6 | A8 |
|---|---|---|---|---|
| 3 | 0.000 | −0.7135E−04 | −0.2976E−06 | 0.4932E−09 |
| 11 | 0.000 | −0.7119E−04 | −0.2973E−05 | |
| 12 | 0.000 | 0.4369E−03 | −0.1219E−04 | 0.2646E−06 |
| 16 | 0.000 | 0.6438E−03 | −0.1986E−04 | |
| 17 | 0.000 | 0.7189E−03 | 0.3582E−05 | |

TABLE 12

LENS GROUP DATA

| Lens Group | 1$^{st}$ Surf. | Focal Length |
|---|---|---|
| 1 | 1 | −7.05 |
| 2 | 8 | 27.88 |
| 3 | 11 | 13.43 |

Numerical Embodiment 4

Figure 19:
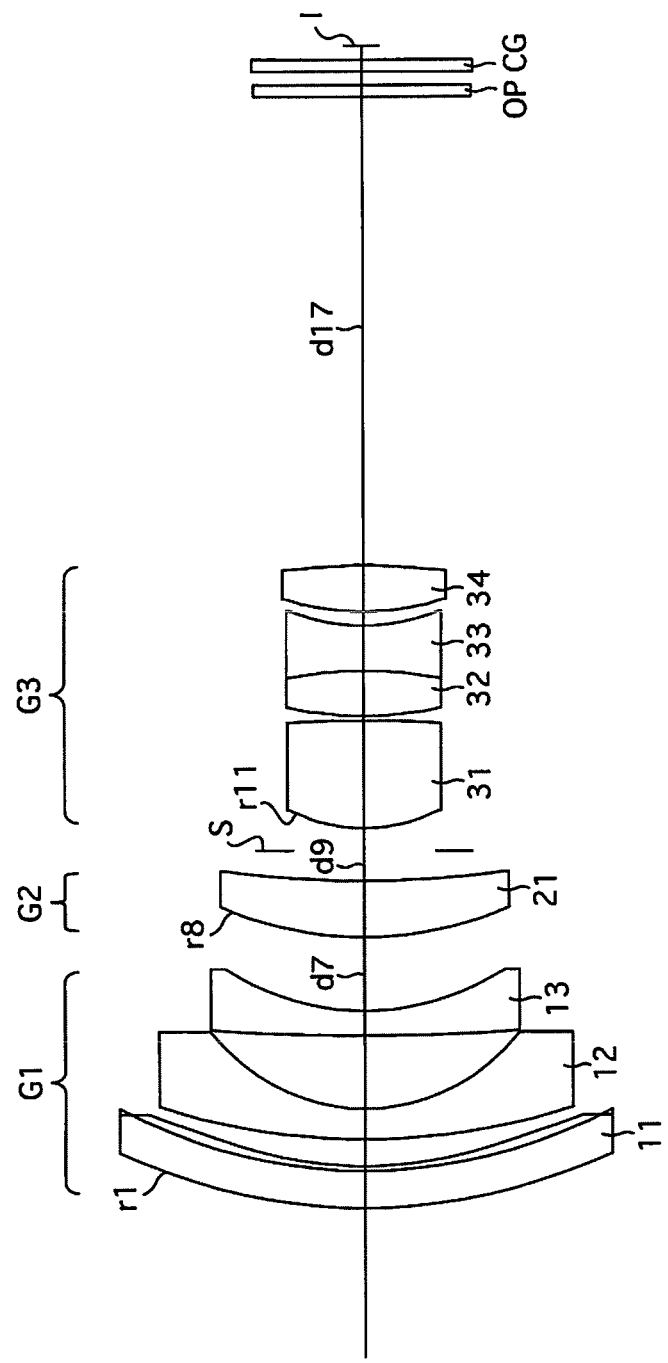
FIG. 19 shows a lens arrangement of a fourth numerical embodiment of a zoom lens system, according to the present invention, at the long focal length extremity when focused on an object at infinity.
Figures 20A, 20B, 20C, 20D:
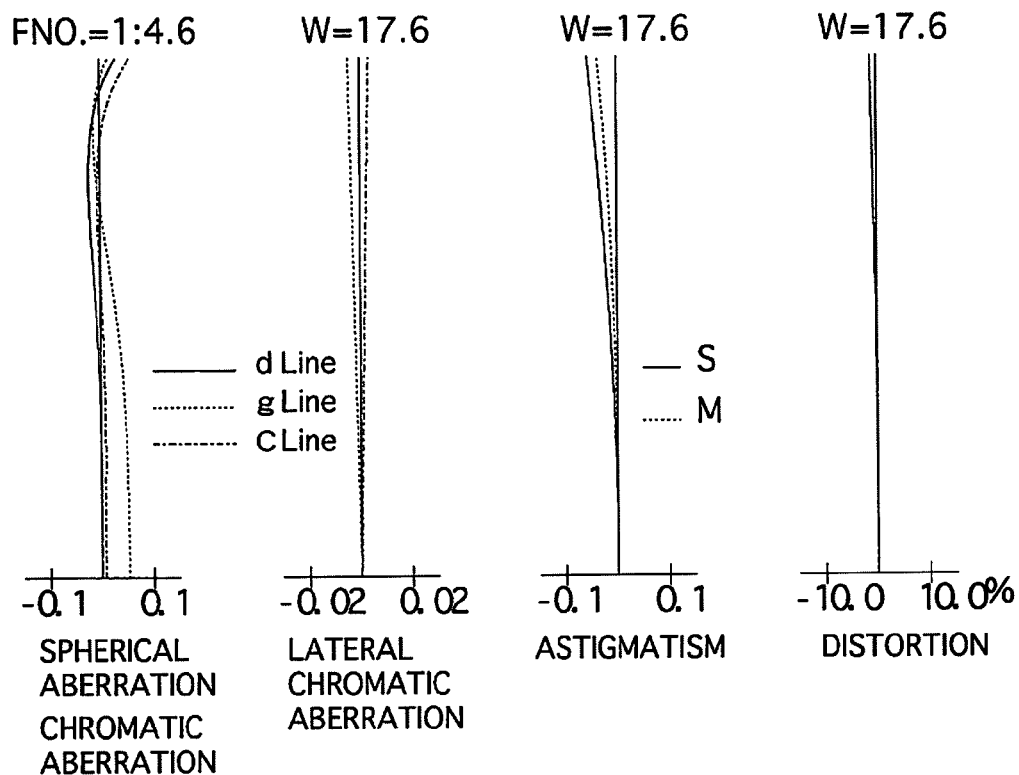
FIGS. 20A, 20B, 20C and 20D show various aberrations that occurred in the lens arrangement shown in FIG. 19.
Figure 21A:
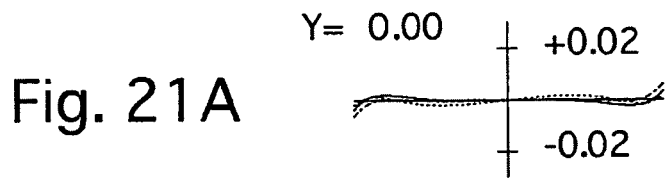
FIGS. 21A, 21B, 21C and 21D show lateral aberrations that occurred in the lens arrangement shown in FIG. 19.
Figure 21B:
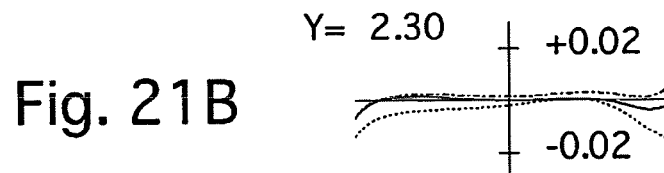
Figure 21C:
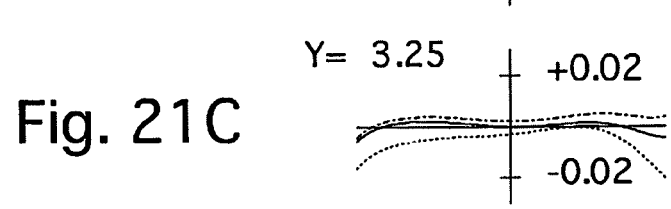
Figure 21D:
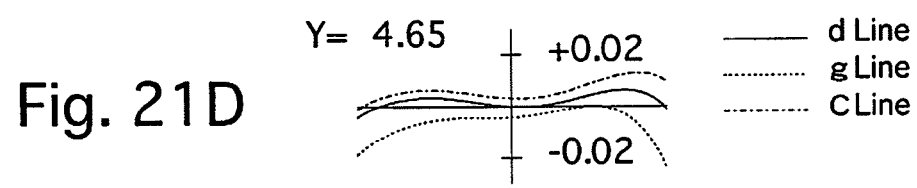
Figure 22:
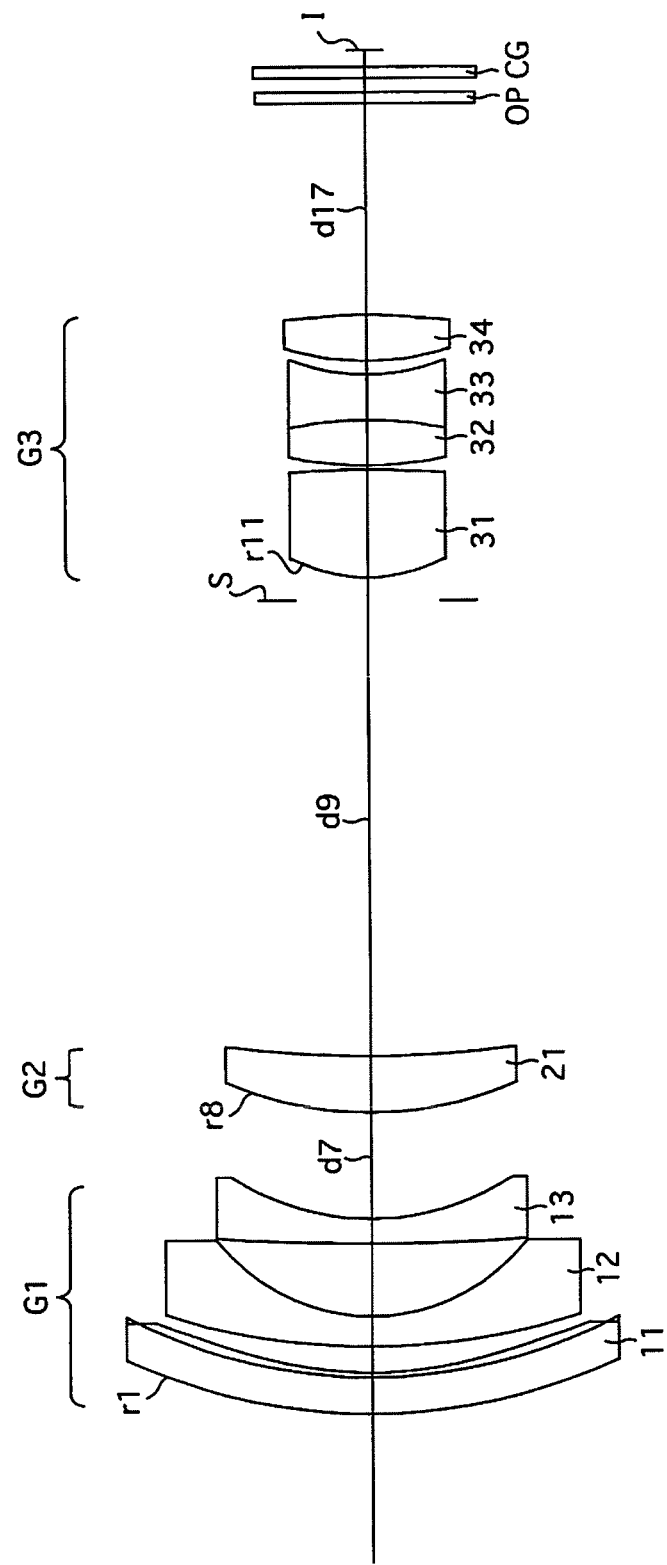
FIG. 22 shows a lens arrangement of the fourth numerical embodiment of the zoom lens system, according to the present invention, at the short focal length extremity when focused on an object at infinity.

FIGS. 19 through 24D and Tables 13 through 16 show a fourth numerical embodiment of a zoom lens system according to the present invention. FIG. 19 shows a lens arrangement of the fourth numerical embodiment of the zoom lens system at the long focal length extremity when focused on an object at infinity. FIGS. 20A, 20B, 20C and 20D show various aberrations that occurred in the lens arrangement shown in FIG. 19. FIGS. 21A, 21B, 21C and 21D show lateral aberrations that occurred in the lens arrangement shown in FIG. 19. FIG. 22 shows a lens arrangement of the fourth numerical embodiment of the zoom lens system at the short focal length extremity when focused on an object at infinity. FIGS. 23A, 23B, 23C and 23D show various aberrations that occurred in the lens arrangement shown in FIG. 22. FIGS. 24A, 24B, 24C and 24D show lateral aberrations that occurred in the lens arrangement shown in FIG. 22. Table 13 shows the lens surface data, Table 14 shows various data of the zoom lens system, Table 15 shows the aspherical surface data, and Table 16 shows various data of the lens groups according to the fourth numerical embodiment of the present invention.

The lens arrangement of the fourth numerical embodiment is the same as that of the first numerical embodiment.

TABLE 13

SURFACE DATA

| Surf. No. | r | d | N(d) | vd |
|---|---|---|---|---|
| 1 | 26.098 | 1.637 | 1.83481 | 37.1 |
| 2 | 23.574 | 0.200 | 1.52972 | 42.7 |
| 3* | 16.883 | 1.200 | | |
| 4 | 31.286 | 1.335 | 1.80400 | 45.8 |
| 5 | 8.865 | 3.198 | | |
| 6 | 96.932 | 1.100 | 1.69680 | 55.5 |
| 7 | 11.568 | d7 | | |
| 8 | 16.474 | 2.484 | 1.84666 | 23.8 |
| 9 | 48.064 | d9 | | |
| 10(Diaphragm) | ∞ | 1.000 | | |
| 11* | 7.364 | 4.726 | 1.49856 | 81.3 |
| 12* | −37.019 | 0.199 | | |
| 13 | 16.966 | 1.997 | 1.49700 | 81.6 |
| 14 | −18.087 | 2.020 | 1.83400 | 37.3 |
| 15 | 9.341 | 0.614 | | |
| 16* | 13.652 | 2.035 | 1.55200 | 68.9 |
| 17* | −18.848 | d17 | | |

TABLE 13-continued

SURFACE DATA

| Surf. No. | r | d | N(d) | vd |
|---|---|---|---|---|
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 14

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.8 | 3.7 | 4.6 |
| f | 5.14 | 10.00 | 14.81 |
| W | 46.1 | 25.6 | 17.6 |
| Y | 4.65 | 4.65 | 4.65 |
| fB | 0.53 | 0.53 | 0.53 |
| L | 60.04 | 50.63 | 51.20 |
| d7 | 4.721 | 3.491 | 3.274 |
| d9 | 20.111 | 6.094 | 1.310 |
| d17 | 9.314 | 15.153 | 20.720 |

TABLE 15

Aspherical Surface Data (the aspherical surface coefficients not indicated are zero (0.00)):

| Surf. No. | K | A4 | A6 | A8 |
|---|---|---|---|---|
| 3 | 0.000 | −0.7497E−04 | −0.2593E−06 | 0.8860E−09 |
| 11 | 0.000 | −0.7322E−04 | −0.3192E−05 | |
| 12 | 0.000 | 0.4259E−03 | −0.1230E−04 | 0.2503E−06 |
| 16 | 0.000 | 0.6298E−03 | −0.1952E−04 | |
| 17 | 0.000 | 0.7105E−03 | 0.4132E−05 | |

TABLE 16

LENS GROUP DATA

| Lens Group | 1st Surf. | Focal Length |
|---|---|---|
| 1 | 1 | −7.12 |
| 2 | 8 | 28.57 |
| 3 | 11 | 13.45 |

Numerical Embodiment 5

Figure 25:
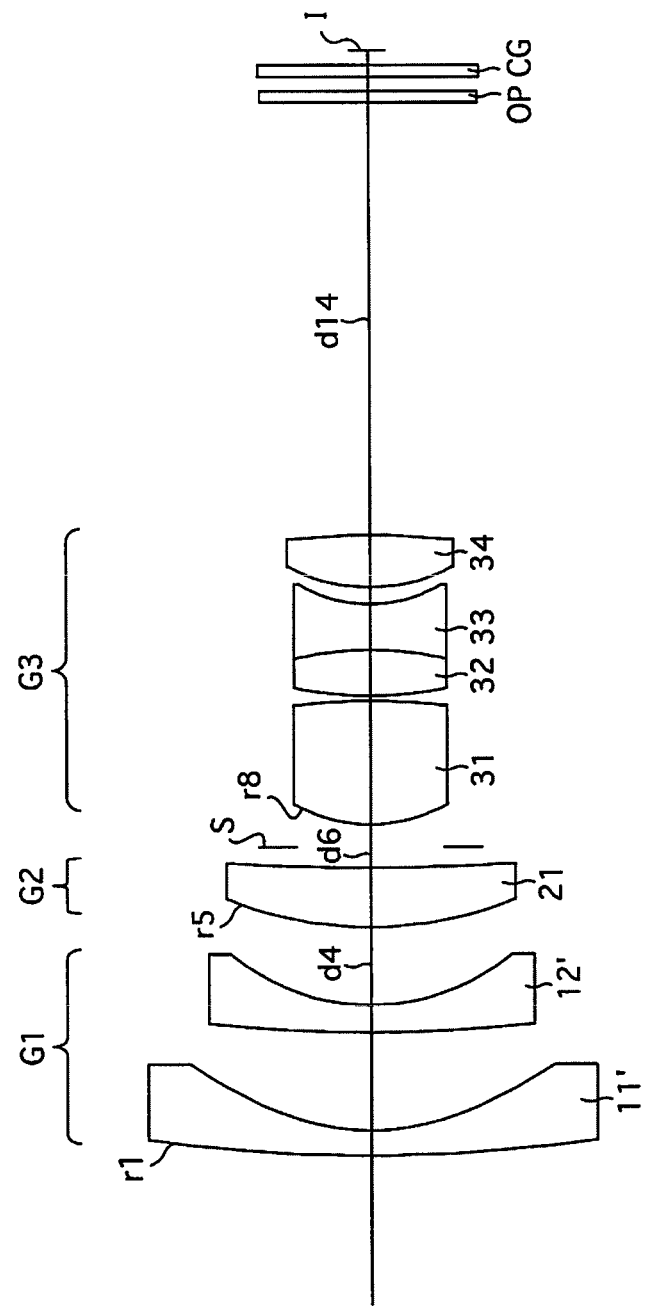
FIG. 25 shows a lens arrangement of a fifth numerical embodiment of a zoom lens system, according to the present invention, at the long focal length extremity when focused on an object at infinity.
Figure 28:
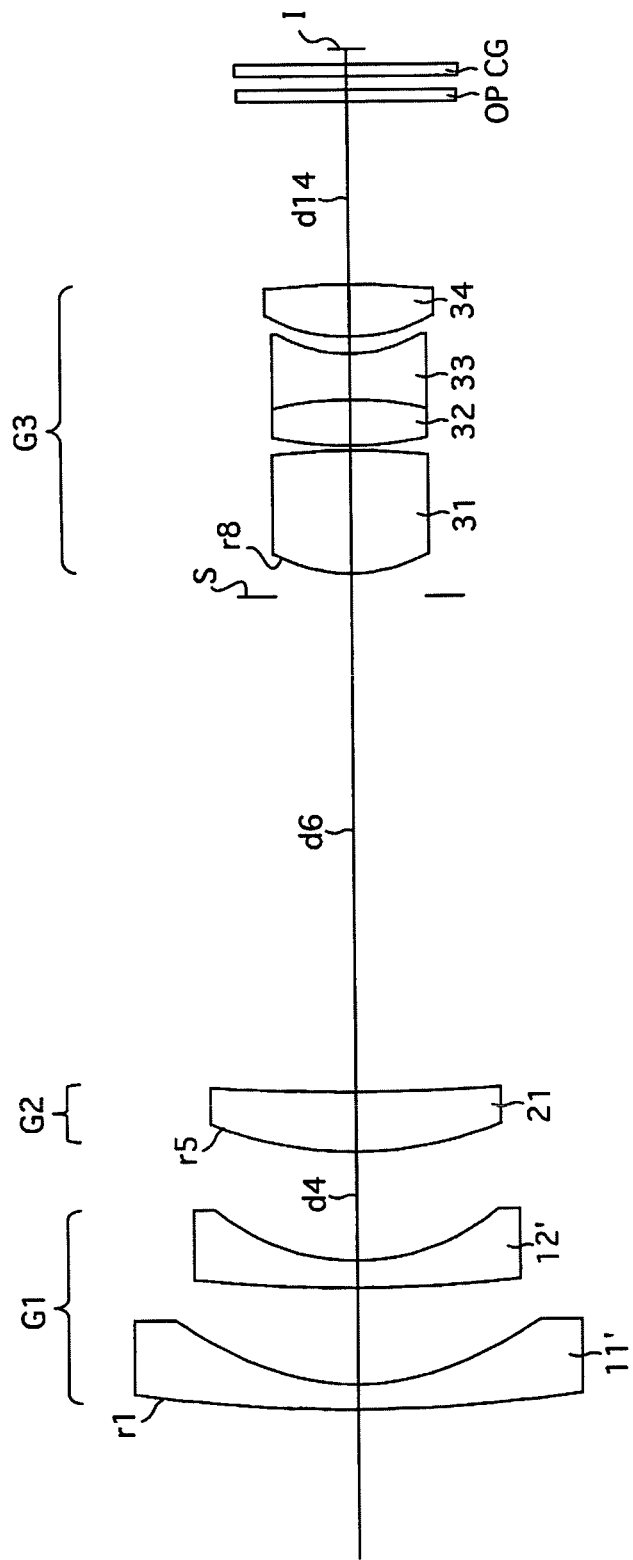
FIG. 28 shows a lens arrangement of the fifth numerical embodiment of the zoom lens system, according to the present invention, at the short focal length extremity when focused on an object at infinity.

FIGS. 25 through 30D and Tables 17 through 20 show a fifth numerical embodiment of a zoom lens system according to the present invention. FIG. 25 shows a lens arrangement of the fifth numerical embodiment of the zoom lens system at the long focal length extremity when focused on an object at infinity. FIGS. 26A, 26B, 26C and 26D show various aberrations that occurred in the lens arrangement shown in FIG. 25. FIGS. 27A, 27B, 27C and 27D show lateral aberrations that occurred in the lens arrangement shown in FIG. 25. FIG. 28 shows a lens arrangement of the fifth numerical embodiment of the zoom lens system at the short focal length extremity when focused on an object at infinity. FIGS. 29A, 29B, 29C and 29D show various aberrations that occurred in the lens arrangement shown in FIG. 28. FIGS. 30A, 30B, 30C and 30D show lateral aberrations that occurred in the lens arrangement shown in FIG. 28. Table 17 shows the lens surface data, Table 18 shows various data of the zoom lens system, Table 19 shows the aspherical surface data, and Table 20 shows various data of the lens groups according to the fifth numerical embodiment of the present invention.

The lens arrangement of the fifth numerical embodiment is the same as that of the first numerical embodiment except that the first lens group G1 is configured of a negative meniscus lens element 11' having a convex surface on the object side, and a negative meniscus lens element 12' having a convex surface on the object side, in that order from the object side. The negative meniscus lens element 11' is provide with an aspherical surface on the image side thereof.

TABLE 17

SURFACE DATA

| Surf. No. | r | d | N(d) | vd |
|---|---|---|---|---|
| 1 | 73.182 | 1.100 | 1.80400 | 46.6 |
| 2* | 10.719 | 4.324 | | |
| 3 | 68.345 | 1.200 | 1.77250 | 42.8 |
| 4 | 10.000 | d4 | | |
| 5 | 17.611 | 2.618 | 1.84666 | 23.8 |
| 6 | 99.577 | d6 | | |
| 7(Diaphragm) | ∞ | 1.000 | | |
| 8* | 7.086 | 5.452 | 1.51103 | 78.7 |
| 9* | −22.847 | 0.224 | | |
| 10 | 17.191 | 2.030 | 1.49700 | 81.6 |
| 11 | −15.017 | 2.020 | 1.83400 | 37.3 |
| 12 | 6.410 | 0.748 | | |
| 13* | 9.558 | 2.296 | 1.55200 | 65.6 |
| 14* | −18.873 | d14 | | |
| 15 | ∞ | 0.500 | 1.51633 | 64.1 |
| 16 | ∞ | 0.620 | | |
| 17 | ∞ | 0.500 | 1.51633 | 64.1 |
| 18 | ∞ | — | | |

The asterisk (*) designates an aspherical surface which is rotationally symmetrical with respect to the optical axis.

TABLE 18

ZOOM LENS SYSTEM DATA
Zoom Ratio: 2.85

| | Short Focal Length Extremity | Intermediate Focal Length | Long Focal Length Extremity |
|---|---|---|---|
| FNO. | 2.8 | 3.7 | 4.6 |
| f | 5.14 | 10.01 | 14.66 |
| W | 45.9 | 25.4 | 17.8 |
| Y | 4.65 | 4.65 | 4.65 |
| fB | 0.53 | 0.53 | 0.53 |
| L | 60.00 | 48.62 | 48.64 |
| d4 | 4.804 | 3.730 | 3.467 |
| d6 | 21.942 | 5.943 | 0.915 |
| d14 | 8.092 | 13.784 | 19.093 |

TABLE 19

Aspherical Surface Data (the aspherical surface coefficients not indicated are zero (0.00)):

| Surf. No. | K | A4 | A6 | A8 |
|---|---|---|---|---|
| 2 | 0.000 | −0.1322E−03 | −0.2369E−06 | −0.9911E−08 |
| 8 | 0.000 | −0.1055E−03 | −0.2717E−05 | |
| 9 | 0.000 | 0.6189E−03 | −0.1329E−04 | 0.3035E−06 |
| 13 | 0.000 | 0.1117E−02 | −0.1573E−04 | |
| 14 | 0.000 | 0.7728E−03 | 0.1441E−04 | |

TABLE 20

LENS GROUP DATA

| Lens Group | 1st Surf. | Focal Length |
|---|---|---|
| 1 | 1 | −6.68 |
| 2 | 5 | 24.90 |
| 3 | 8 | 13.97 |

Numerical Embodiment 6

Figure 31:
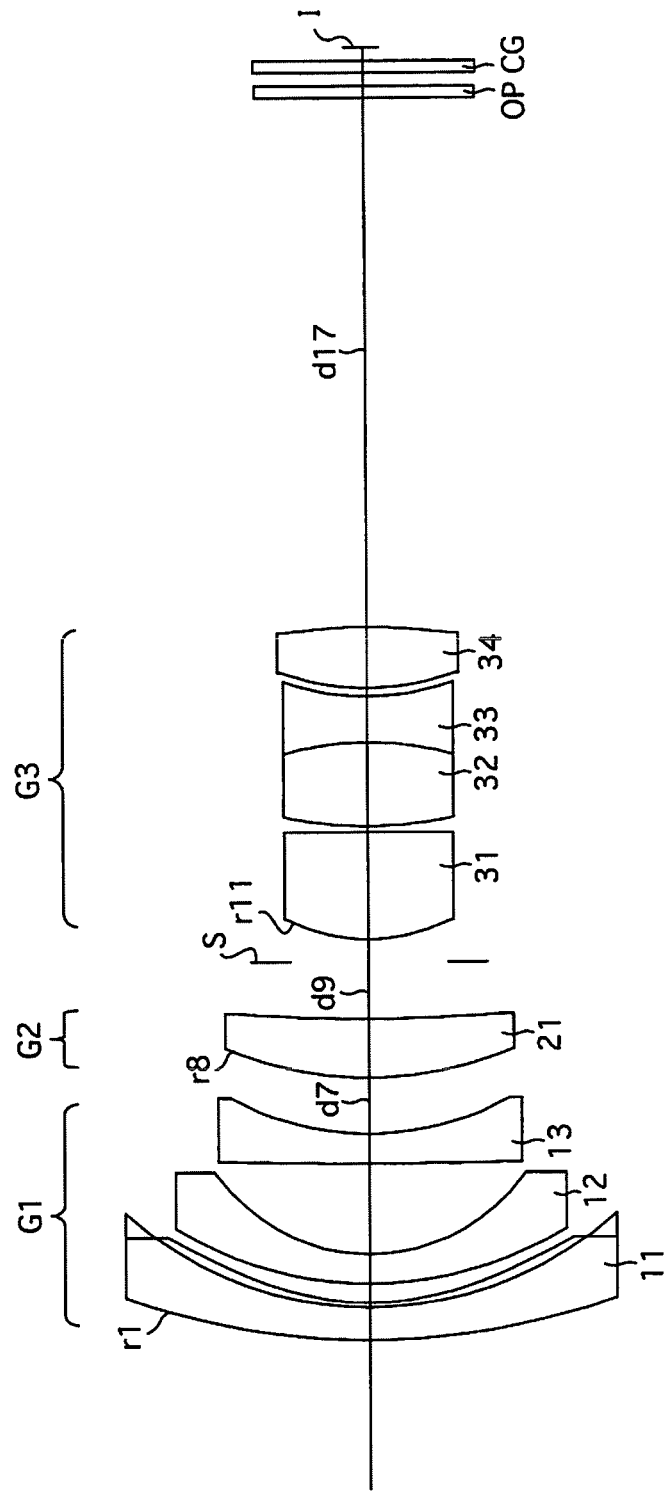
FIG. 31 shows a lens arrangement of a sixth numerical embodiment of a zoom lens system, according to the present invention, at the long focal length extremity when focused on an object at infinity.
Figures 32A, 32B, 32C, 32D:
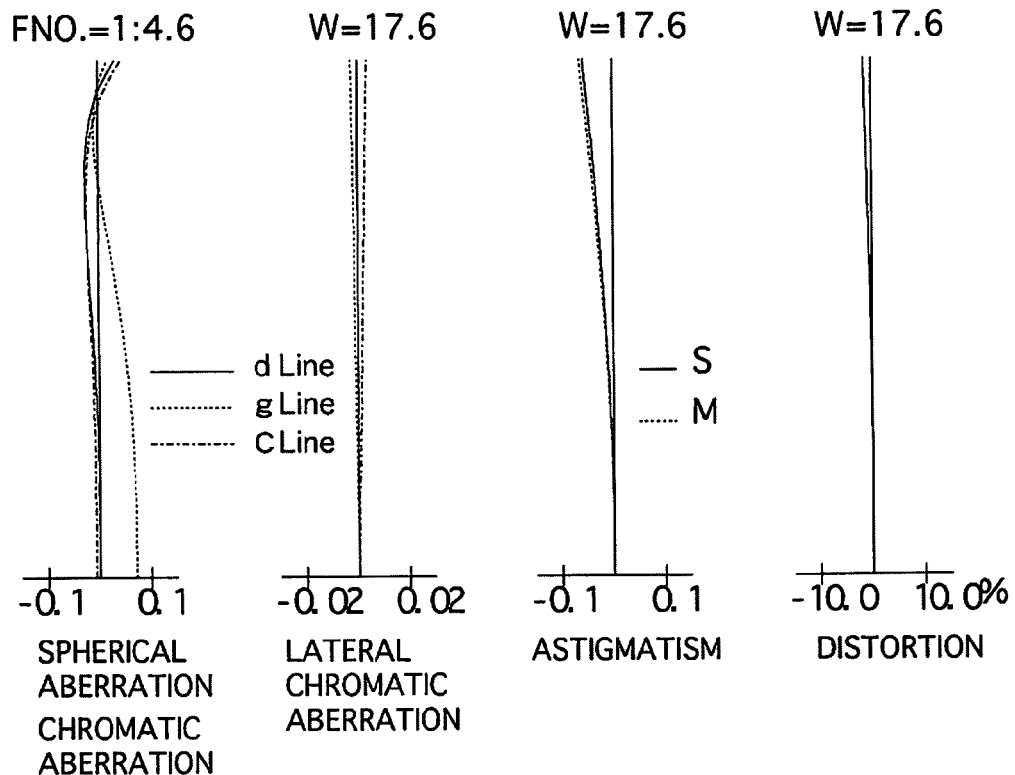
FIGS. 32A, 32B, 32C and 32D show various aberrations that occurred in the lens arrangement shown in FIG. 31.
Figure 33A:
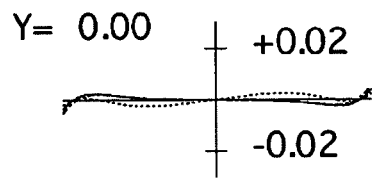
FIGS. 33A, 33B, 33C and 33D show lateral aberrations that occurred in the lens arrangement shown in FIG. 31.
Figure 33B:
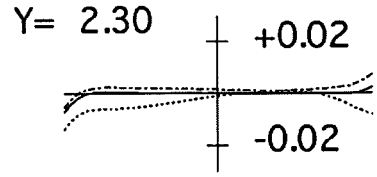
Figure 33C:
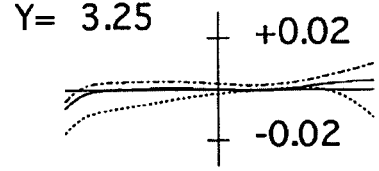
Figure 33D:
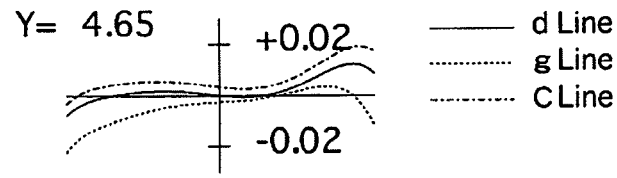
Figure 34:
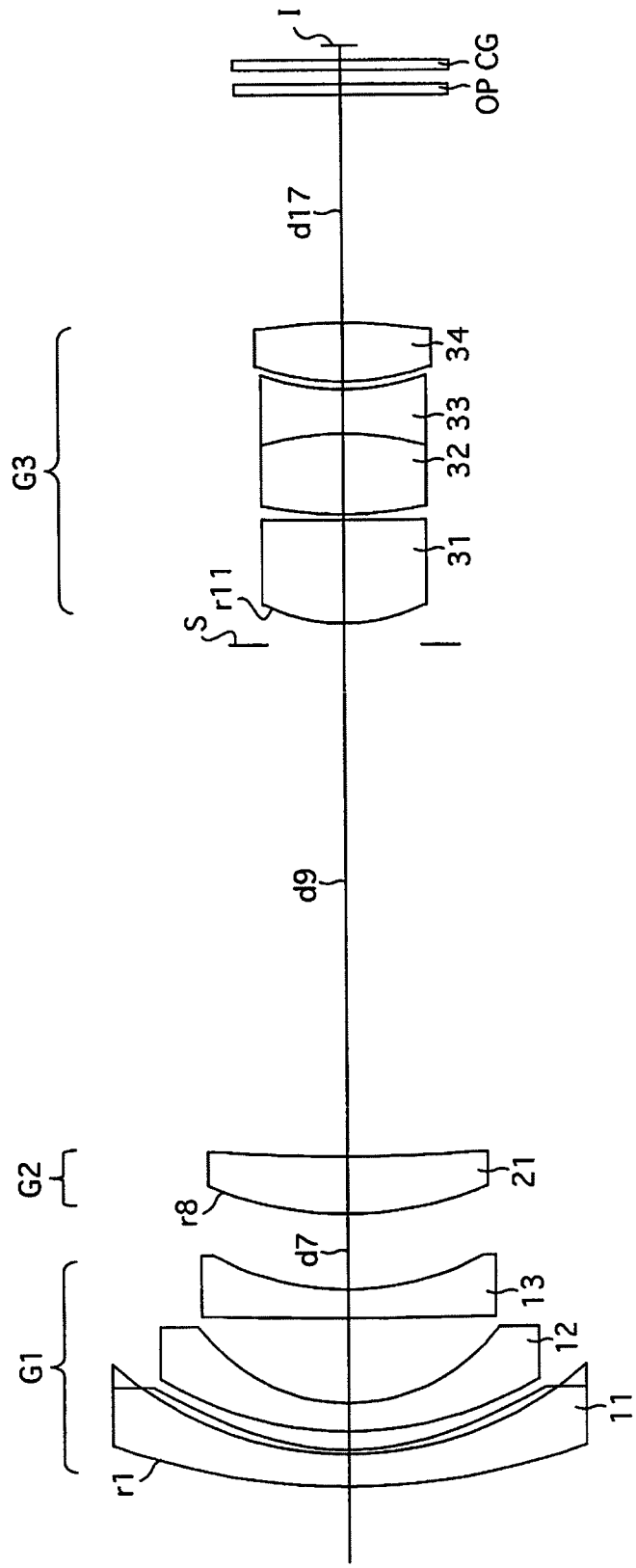
FIG. 34 shows a lens arrangement of the sixth numerical embodiment of the zoom lens system, according to the present invention, at the short focal length extremity when focused on an object at infinity.
Figures 35A, 35B, 35C, 35D:
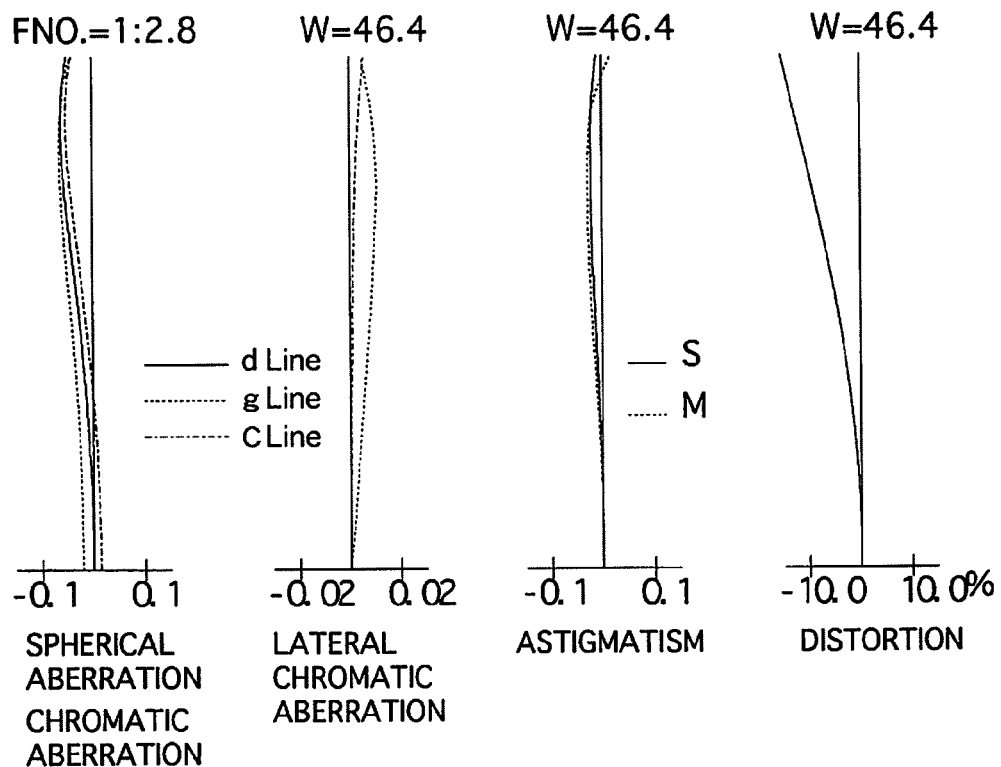
FIGS. 35A, 35B, 35C and 35D show various aberrations that occurred in the lens arrangement shown in FIG. 34.
Figure 36A:
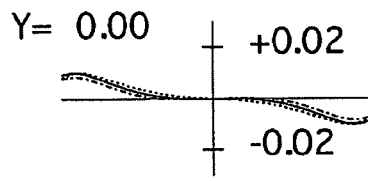
FIGS. 36A, 36B, 36C and 36D show lateral aberrations that occurred in the lens arrangement shown in FIG. 34.
Figure 36B:
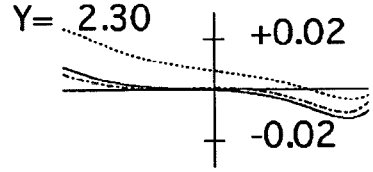
Figure 36C:
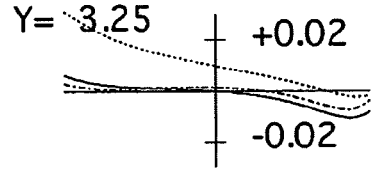
Figure 36D:
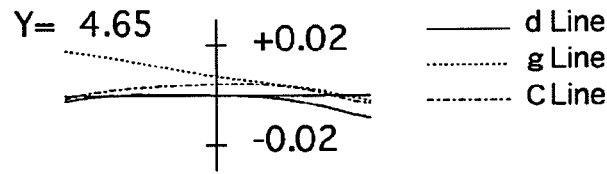

FIGS. 31 through 36D and Tables 21 through 24 show a sixth numerical embodiment of a zoom lens system according to the present invention. FIG. 31 shows a lens arrangement of the sixth numerical embodiment of the zoom lens system at the long focal length extremity when focused on an object at infinity. FIGS. 32A, 32B, 32C and 32D show various aberrations that occurred in the lens arrangement shown in FIG. 31. FIGS. 33A, 33B, 33C and 33D show lateral aberrations that occurred in the lens arrangement shown in FIG. 31. FIG. 34 shows a lens arrangement of the sixth numerical embodiment of the zoom lens system at the short focal length extremity when focused on an object at infinity. FIGS. 35A, 35B, 35C and 35D show various aberrations that occurred in the lens arrangement shown in FIG. 31. FIGS. 36A, 36B, 36C and 36D show lateral aberrations that occurred in the lens arrangement shown in FIG. 34. Table 21 shows the lens surface data, Table 22 shows various data of the zoom lens system, Table 23 shows the aspherical surface data, and Table 24 shows various data of the lens groups according to the sixth numerical embodiment of the present invention.

The lens arrangement of the sixth numerical embodiment is the same as that of the first numerical embodiment.

TABLE 21

SURFACE DATA

| Surf. No. | r | d | N(d) | vd |
|---|---|---|---|---|
| 1 | 32.331 | 1.500 | 1.80420 | 46.5 |
| 2 | 16.659 | 0.200 | 1.52972 | 42.7 |
| 3* | 12.789 | 0.852 | | |
| 4 | 17.074 | 1.300 | 1.83481 | 42.7 |
| 5 | 8.652 | 3.959 | | |
| 6 | 249.303 | 1.300 | 1.77250 | 49.6 |
| 7 | 13.217 | d7 | | |
| 8 | 17.004 | 2.612 | 1.84666 | 23.8 |
| 9 | 80.028 | d9 | | |
| 10(Diaphragm) | ∞ | 1.000 | | |
| 11* | 8.333 | 4.719 | 1.49710 | 81.6 |
| 12* | −430.837 | 0.262 | | |
| 13 | 18.580 | 3.702 | 1.49700 | 81.6 |
| 14 | −14.042 | 2.020 | 1.83400 | 37.3 |
| 15 | 11.437 | 0.365 | | |
| 16* | 11.947 | 2.694 | 1.59891 | 65.2 |
| 17* | −20.235 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 22

ZOOM LENS SYSTEM DATA
Zoom Ratio: 2.89

| | Short Focal Length Extremity | Intermediate Focal Length | Long Focal Length Extremity |
|---|---|---|---|
| FNO. | 2.8 | 3.7 | 4.6 |
| f | 5.14 | 10.00 | 14.86 |
| W | 46.4 | 25.7 | 17.6 |
| Y | 4.65 | 4.65 | 4.65 |
| fB | 0.53 | 0.53 | 0.53 |
| L | 65.99 | 56.08 | 57.03 |
| d7 | 3.500 | 2.638 | 2.473 |
| d9 | 23.405 | 7.791 | 2.533 |
| d17 | 10.447 | 17.013 | 23.390 |

TABLE 23

Aspherical Surface Data (the aspherical surface coefficients not indicated are zero (0.00)):

| Surf. No. | K | A4 | A6 | A8 |
|---|---|---|---|---|
| 3 | 0.000 | −0.8830E−04 | −0.5035E−06 | −0.7798E−09 |
| 11 | 0.000 | −0.3384E−04 | −0.8764E−06 | |
| 12 | 0.000 | 0.1846E−03 | −0.2859E−05 | 0.7671E−07 |
| 16 | 0.000 | 0.1359E−03 | −0.4273E−05 | |
| 17 | 0.000 | 0.3742E−03 | 0.4655E−05 | |

TABLE 24

LENS GROUP DATA

| Lens Group | 1st Surf. | Focal Length |
|---|---|---|
| 1 | 1 | −6.50 |
| 2 | 8 | 25.03 |
| 3 | 11 | 14.80 |

Numerical Embodiment 7

Figure 37:
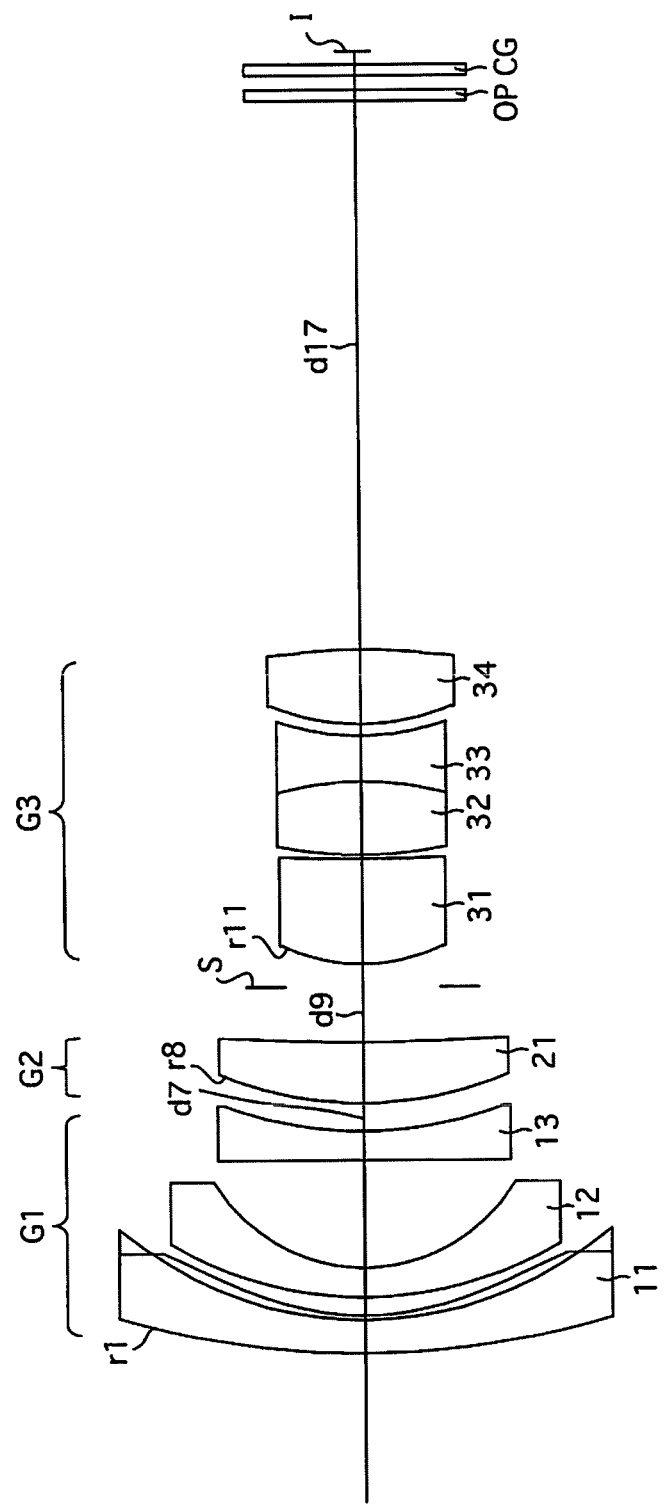
FIG. 37 shows a lens arrangement of a seventh numerical embodiment of a zoom lens system, according to the present invention, at the long focal length extremity when focused on an object at infinity.
Figure 40:
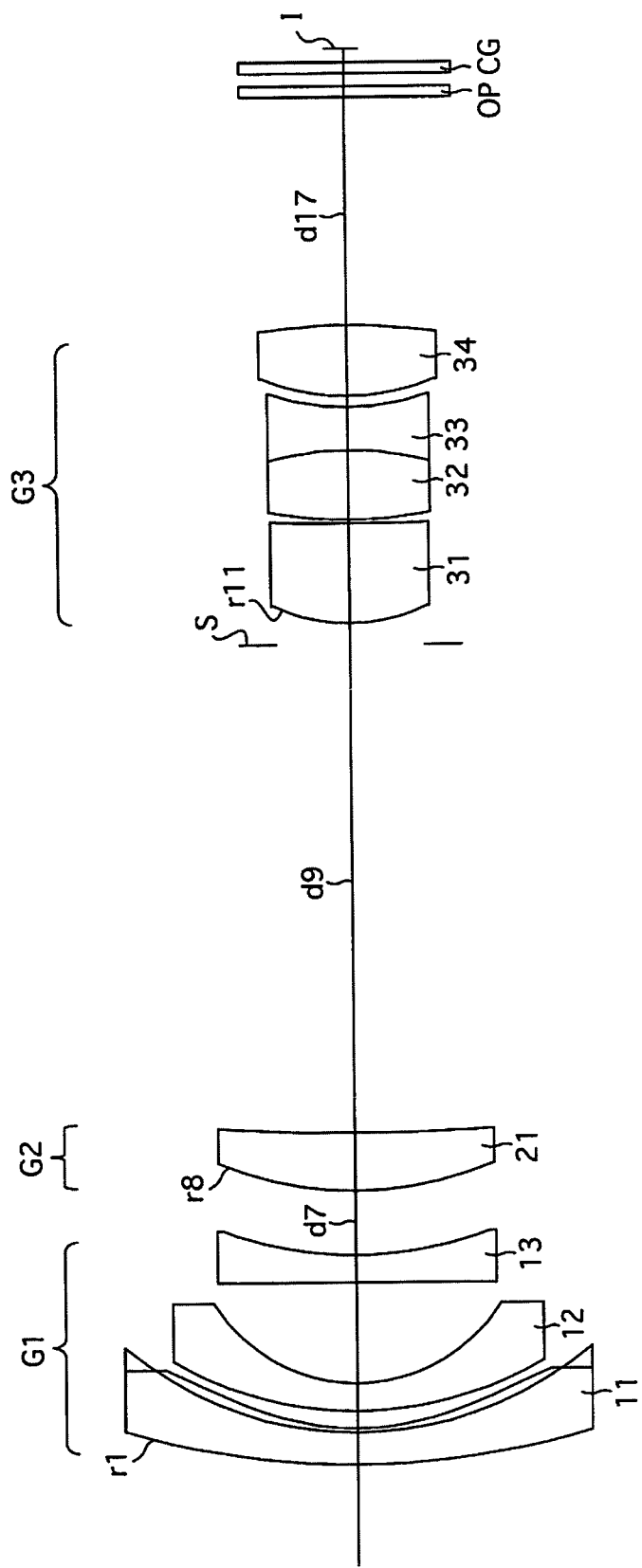
FIG. 40 shows a lens arrangement of the seventh numerical embodiment of the zoom lens system, according to the present invention, at the short focal length extremity when focused on an object at infinity.
Figures 41A, 41B, 41C, 41D:
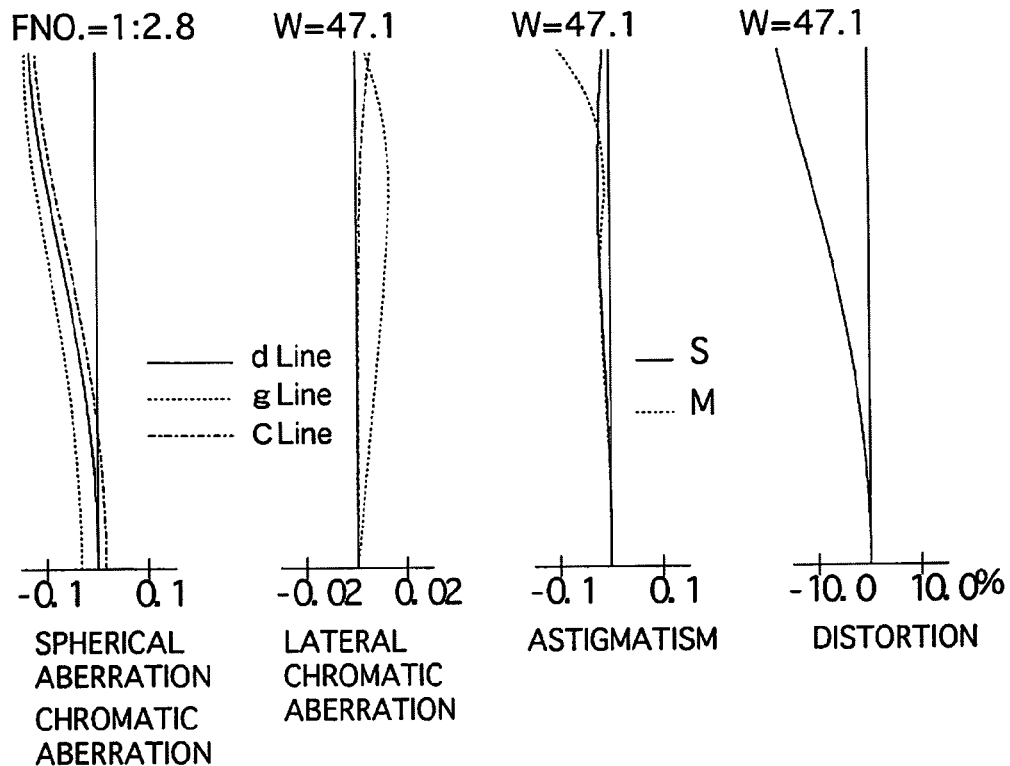
FIGS. 41A, 41B, 41C and 41D show various aberrations that occurred in the lens arrangement shown in FIG. 40.
Figure 42A:
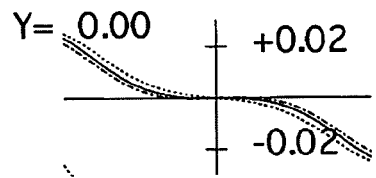
FIGS. 42A, 42B, 42C and 42D show lateral aberrations that occurred in the lens arrangement shown in FIG. 40.
Figure 42B:
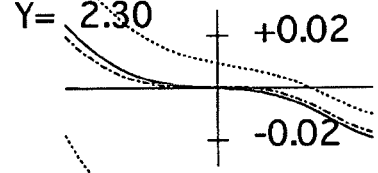
Figure 42C:
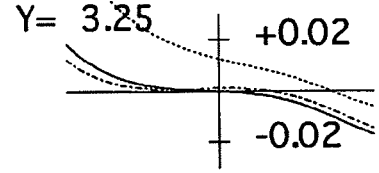
Figure 42D:
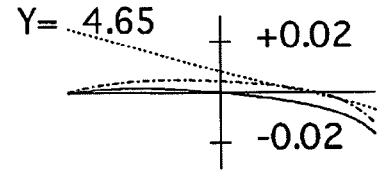

FIGS. 37 through 42D and Tables 25 through 28 show a seventh numerical embodiment of a zoom lens system according to the present invention. FIG. 37 shows a lens arrangement of the seventh numerical embodiment of the zoom lens system at the long focal length extremity when focused on an object at infinity. FIGS. 38A, 38B, 38C and 38D show various aberrations that occurred in the lens arrangement shown in FIG. 37. FIGS. 39A, 39B, 39C and 39D show lateral aberrations that occurred in the lens arrangement shown in FIG. 37. FIG. 40 shows a lens arrangement of the seventh numerical embodiment of the zoom lens system at the short focal length extremity when focused on an object at infinity. FIGS. 41A, 41B, 41C and 41D show various aberrations that occurred in the lens arrangement shown in FIG. 40. FIGS. 42A, 42B, 42C and 42D show lateral aberrations that occurred in the lens arrangement shown in FIG. 40. Table 25 shows the lens surface data, Table 26 shows various data of the zoom lens system, Table 27 shows the aspherical surface data, and Table 28 shows various data of the lens groups according to the seventh numerical embodiment of the present invention.

The lens arrangement of the seventh numerical embodiment is the same as that of the first numerical embodiment except that the positive lens element 31 of the third lens group G3 is a positive meniscus lens element having a convex surface on the object side.

TABLE 25

SURFACE DATA

| Surf. No. | r | d | N(d) | νd |
|---|---|---|---|---|
| 1 | 38.612 | 1.500 | 1.80420 | 46.5 |
| 2 | 17.016 | 0.200 | 1.52972 | 42.7 |
| 3* | 12.435 | 0.806 | | |
| 4 | 17.370 | 1.300 | 1.83481 | 42.7 |
| 5 | 7.946 | 4.755 | | |
| 6 | 3687.143 | 1.300 | 1.77250 | 49.6 |
| 7 | 18.154 | d7 | | |
| 8 | 17.059 | 2.685 | 1.84666 | 23.8 |
| 9 | 105.104 | d9 | | |
| 10(Diaphragm) | ∞ | 1.000 | | |
| 11* | 8.303 | 4.667 | 1.49710 | 81.6 |
| 12* | 614.983 | 0.158 | | |
| 13 | 20.363 | 3.239 | 1.49700 | 81.6 |
| 14 | −14.892 | 2.020 | 1.83400 | 37.3 |
| 15 | 11.710 | 0.510 | | |
| 16* | 11.005 | 3.273 | 1.59891 | 65.2 |
| 17* | −21.331 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 26

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.8 | 3.7 | 4.6 |
| f | 5.14 | 10.00 | 14.80 |
| W | 47.1 | 25.8 | 17.7 |
| Y | 4.65 | 4.65 | 4.65 |
| fB | 0.53 | 0.53 | 0.53 |
| L | 65.89 | 56.28 | 57.42 |
| d7 | 3.000 | 1.442 | 1.242 |
| d9 | 22.715 | 7.586 | 2.431 |
| d17 | 10.612 | 17.692 | 24.185 |

TABLE 27

Aspherical Surface Data (the aspherical surface coefficients not indicated are zero (0.00)):

| Surf. No. | K | A4 | A6 | A8 |
|---|---|---|---|---|
| 3 | 0.000 | −0.1048E−03 | −0.7507E−06 | −0.7366E−09 |
| 11 | 0.000 | −0.2076E−04 | −0.9827E−06 | |
| 12 | 0.000 | 0.1829E−03 | −0.2536E−05 | 0.4266E−07 |
| 16 | 0.000 | 0.9436E−04 | −0.4178E−05 | |
| 17 | 0.000 | 0.3574E−03 | 0.3691E−05 | |

TABLE 28

LENS GROUP DATA

| Lens Group | 1st Surf. | Focal Length |
|---|---|---|
| 1 | 1 | −6.33 |
| 2 | 8 | 23.72 |
| 3 | 11 | 14.99 |

The numerical values of each condition for each embodiment are shown in Table 29.

TABLE 29

| | Embod. 1 | Embod. 2 | Embod. 3 | Embod. 4 |
|---|---|---|---|---|
| Cond. (1) | | | | |
| $|d12w/f1|$ | 0.92 | 0.85 | 0.68 | 0.66 |
| Cond. (2) | | | | |
| d12w | 6.822 | 6.497 | 4.828 | 4.721 |
| d23w | 23.449 | 22.017 | 21.076 | 21.111 |
| Cond. (3) | | | | |
| m2w | 1.84 | 1.78 | 1.74 | 1.83 |
| Cond. (4) | | | | |
| SF | −0.54 | −0.45 | −0.50 | −0.49 |

| | Embod. 5 | Embod. 6 | Embod. 7 |
|---|---|---|---|
| Cond. (1) | | | |
| $|d12w/f1|$ | 0.72 | 0.54 | 0.47 |
| Cond. (2) | | | |
| d12w | 4.804 | 3.500 | 3.000 |
| d23w | 22.942 | 24.405 | 23.715 |
| Cond. (3) | | | |
| m2w | 2.13 | 1.92 | 2.08 |
| Cond. (4) | | | |
| SF | −0.70 | −0.65 | −0.72 |

As can be understood from Table 29, the first through seventh numerical embodiments satisfy conditions (1) through (4). Furthermore, as can be understood from the aberration diagrams, the various aberrations are favorably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, and a positive third lens group, in that order from the object side, wherein said second lens group constitutes a focusing lens group that is moved in the optical axis direction during a focusing operation, and wherein the following conditions (1) and (2) are satisfied:

$$0.4 < |d12w/f1| < 1.0 \qquad (1); \text{ and}$$

$$d12w < d23w \qquad (2),$$

wherein f1 designates the focal length of said first lens group, d12w designates the air-distance between the surface closest to the image side of said first lens group to the surface closest to the object side of said second lens group at the short focal length extremity, and d23w designates the air-distance between the surface closest to the image side of said second lens group to the surface closest to the object side of said third lens group at the short focal length extremity.

2. The zoom lens system according to claim 1, wherein the following condition (3) is satisfied:

$$1.5 < m2w < 2.3 \qquad (3),$$

wherein m2w designates the lateral magnification of said second lens group when focused on an object at infinity at the short focal length extremity.

3. The zoom lens system according to claim 1, wherein the following condition (4) is satisfied:

$$-1 < SF < 0 \tag{4},$$

wherein $$SF = (R2F - R2R)/(R2F + R2R);$$

R2F designates the radius of curvature of the surface closest to the object side within said second lens group; and R2R designates the radius of curvature of the surface closest to the image side within said second lens group.

4. The zoom lens system according to claim 1, wherein said second lens group comprises a positive single lens element.

5. The zoom lens system according to claim 1, wherein at least one aspherical-surfaced lens element is provided in each of said first lens group and said third lens group.

6. The zoom lens system according to claim 1, wherein said first lens group comprises at least two negative lens elements that each has a concave surface on the image side.

7. The zoom lens system according to claim 1, wherein said first lens group comprises three negative lens element which each has a concave surface on the image side.

8. The zoom lens system according to claim 1, wherein said third lens group comprises at least three positive lens elements.

9. The zoom lens system according to claim 1, wherein a diaphragm is provided in between said second lens group and said third lens group.

10. An optical instrument comprising an image sensor that electronically converts an image that is formed through the zoom lens system according to claim 1 into a signal.

* * * * *